(12) United States Patent
Kim et al.

(10) Patent No.: US 12,546,773 B2
(45) Date of Patent: Feb. 10, 2026

(54) MICROFLUIDIC MICROPARTICLE-LABELED IMPEDANCE SENSOR ARRAY FOR ENHANCING BIOASSAY SENSITIVITY

(71) Applicants: UNIVERSITY OF UTAH RESEARCH FOUNDATION, Salt Lake City, UT (US); TEXAS TECH UNIVERSITY SYSTEM, Lubbock, TX (US)

(72) Inventors: Jungkyu Kim, Salt Lake City, UT (US); Ali Khodayari Bavil, Salt Lake City, UT (US)

(73) Assignees: UNIVERSITY OF UTAH RESEARCH FOUNDATION, Salt Lake City, UT (US); TEXAS TECH UNIVERSITY SYSTEM, Lubbock, TX (US)

( * ) Notice: Subject to any disclaimer, the term of this patent is extended or adjusted under 35 U.S.C. 154(b) by 920 days.

(21) Appl. No.: 17/691,972

(22) Filed: Mar. 10, 2022

(65) Prior Publication Data

US 2022/0291211 A1  Sep. 15, 2022

Related U.S. Application Data

(60) Provisional application No. 63/160,594, filed on Mar. 12, 2021.

(51) Int. Cl.
*G01N 1/00* (2006.01)
*B01L 3/00* (2006.01)
(Continued)

(52) U.S. Cl.
CPC .... *G01N 33/5438* (2013.01); *B01L 3/502715* (2013.01); *B01L 3/502761* (2013.01);
(Continued)

(58) Field of Classification Search
None
See application file for complete search history.

(56) References Cited

U.S. PATENT DOCUMENTS

| | | |
|---|---|---|
| 9,132,425 B2 | 9/2015 | Wen et al. |
| 10,059,982 B2 | 8/2018 | Esfandyarpour |

(Continued)

FOREIGN PATENT DOCUMENTS

| | | |
|---|---|---|
| WO | 1989010564 A1 | 11/1989 |
| WO | 2018057647 A1 | 3/2018 |

(Continued)

OTHER PUBLICATIONS

International Search Report and Written Opinion for application PCT/US2022/019800, dated Jun. 9, 2022 (18 pages).

(Continued)

*Primary Examiner* — Jyoti Nagpaul
(74) *Attorney, Agent, or Firm* — Michael Best & Friedrich LLP

(57) ABSTRACT

Described herein are devices and methods for improved detection and quantitation of biomolecules. Devices and methods may include a microfluidic biosensing platform for measuring electrical impedance changes in the presence of target analytes from sinusoidal input voltages to improve the sensitivity of immunoassays. In one embodiment, the described devices and methods may provide a point-of-care immunoassay platform for quantitative diagnostics using signal-enhancing microparticles to improve sensitivity and the limit-of-detection.

34 Claims, 17 Drawing Sheets

(51) Int. Cl.
  *G01N 27/12* (2006.01)
  *G01N 33/543* (2006.01)
(52) U.S. Cl.
  CPC ..... *G01N 27/125* (2013.01); *G01N 33/54306* (2013.01); *B01L 2300/0645* (2013.01); *B01L 2300/0883* (2013.01); *B01L 2400/0406* (2013.01)

(56) References Cited

U.S. PATENT DOCUMENTS

| | | | |
|---|---|---|---|
| 2010/0075340 A1 | 3/2010 | Javanmard et al. | |
| 2011/0174623 A1 | 7/2011 | Harrold et al. | |
| 2013/0319880 A1 | 12/2013 | Wu et al. | |
| 2014/0081012 A1 | 3/2014 | Desimone et al. | |
| 2016/0199832 A1 | 7/2016 | Jamshidi et al. | |
| 2017/0248573 A1 | 8/2017 | Sullivan et al. | |
| 2018/0059101 A1 | 3/2018 | MacKay et al. | |
| 2018/0095067 A1 | 4/2018 | Huff et al. | |
| 2018/0104694 A1 | 4/2018 | Huff et al. | |
| 2019/0072547 A1* | 3/2019 | Ahn | B01L 3/50273 |
| 2019/0250159 A1 | 8/2019 | Almasri et al. | |
| 2019/0346435 A1 | 11/2019 | Yanik et al. | |
| 2020/0075340 A1 | 3/2020 | Thorum et al. | |
| 2020/0171496 A1 | 6/2020 | Skands et al. | |
| 2020/0182864 A1 | 6/2020 | Lee et al. | |
| 2020/0398225 A1 | 12/2020 | McNeely et al. | |
| 2021/0025883 A1 | 1/2021 | Packirisamy et al. | |
| 2021/0055295 A1 | 2/2021 | Eason et al. | |

FOREIGN PATENT DOCUMENTS

| | | |
|---|---|---|
| WO | 2018170156 A1 | 9/2018 |
| WO | 2019084051 A1 | 5/2019 |

OTHER PUBLICATIONS

Wu, G., et al. "The effect of ionic strength on the sensing performance of liquid-gated biosensors." 2017 IEEE 17th International Conference on Nanotechnology (IEEE—NANO). IEEE, 2017, pp. 242-245.
Itu, W., et al. "Tungsten-doping-induced surface reconstruction of porous ternary Pt-based alloy electrocatalyst for oxygen reduction." Advanced Functional Materials 29.7 (2019): 1807070.
Van Gerwen, P., et al. "Nanoscaled interdigitated electrode arrays for biochemical sensors." Sensors and Actuators B: Chemical 49.1-2 (1998): 73-80.
Welch, N. G., et al. "Orientation and characterization of immobilized antibodies for improved immunoassays." Biointerphases 12.2 (2017): 02D301.
Xu, Y., et al. "Probing DNA hybridization by impedance measurement based on CdS-oligonucleotide nanoconjugates." Electroanalysis: An International Journal Devoted to Fundamental and Practical Aspects of Electroanalysis 16.1-2 (2004): 150-155.
Yagati, A. K., et al. "Sensitivity enhancement of capacitive tumor necrosis factor-α detection by deposition of nanoparticles on interdigitated electrode." Japanese Journal of Applied Physics 55.6S1 (2016): 06GN06.
Yang, L. et al. "Interdigitated array microelectrode-based electrochemical impedance immunosensor for detection of *Escherichia coli* O157: H7." Analytical chemistry 76.4 (2004): 1107-1113.
Yeh, C.-H. et al. "Development of an impedimetric immunobiosensor for measurement of carcinoembryonic antigen." Sensors and Actuators A: Physical 241 (2016): 203-211.
Zou, Z., et al. "Functionalized nano interdigitated electrodes arrays on polymer with integrated microfluidics for direct bio-affinity sensing using impedimetric measurement." Sensors and Actuators A: Physical 136.2 (2007): 518-526.
European Patent Office. Extended European Search Report for Application No. 22768012.1, dated Jan. 8, 2025 (13 pages).
Kim, J., et al. "Lifting gate polydimethylsiloxane microvalves and pumps for microfluidic control." Analytical chemistry 84.4 (2012): 2067-2071.
Bavil, A. K., et al. "A microfluidic microparticle-labeled impedance sensor array for enhancing immunoassay sensitivity." Analyst 146.10 (2021): 3289-3298.
Tan, F., et al. "A PDMS microfluidic impedance immunosensor for *E. coli* O157: H7 and *Staphylococcus aureus* detection via antibody-immobilized nanoporous membrane." Sensors and Actuators B: Chemical 159.1 (2011): 328-335.
Abdolalizadeh, J., et al. "Affinity purification of tumor necrosis factor-α expressed in raji cells by produced scFv antibody coupled CNBr-activated sepharose." Advanced pharmaceutical bulletin 3.1 (2013): 19-23.
Acres, R. G., et al. "Molecular structure of 3-aminopropyltriethoxysilane layers formed on silanol-terminated silicon surfaces." The Journal of Physical Chemistry C 116.10 (2012): 6289-6297.
Ali, M. A. et al. "Protein functionalized carbon nanotubes-based smart lab-on-a-chip." ACS Applied Materials & Interfaces 7.10 (2015): 5837-5846.
Altintas, Z. et al. "Gold nanoparticle modified capacitive sensor platform for multiple marker detection." Talanta 118 (2014): 270-276.
Armbruster, D. A., et al. "Limit of blank, limit of detection and limit of quantitation." The clinical biochemist reviews 29.Suppl 1 (2008): S49-S52.
Bavil et al., "A capillary flow-driven microfluidic system for microparticle-labeled immunoassays", Analyst, 2018, vol. 143, pp. 3335-3342.
Berggren, C. et al. "Capacitive biosensors." Electroanalysis: An International Journal Devoted to Fundamental and Practical Aspects of Electroanalysis 13.3 (2001): 173-180.
Bhalla, V., et al. "Gold nanoparticles mediated label-free capacitance detection of cardiac troponin I." Sensors and Actuators B: Chemical 161.1 (2012): 761-768.
Chang, L., et al. "Band gap tuning of nickelates for photovoltaic applications." Journal of Physics D: Applied Physics 49.44 (2016): 44LT02.
Chen, S. et al. "Electrochemical quantized capacitance charging of surface ensembles of gold nanoparticles." The Journal of Physical Chemistry B 103.45 (1999): 9996-10000.
Chiang, C.-Y., et al. "Data collection and analysis using wearable sensors for monitoring knee range of motion after total knee arthroplasty." Sensors 17.2 (2017): 418.
Chuang, Y.-H., et al. "Electrical impedimetric biosensors for liver function detection." Biosensors and Bioelectronics 28.1 (2011): 368-372.
Chuang, C.-H., et al. "Immunosensor for the ultrasensitive and quantitative detection of bladder cancer in point of care testing" Biosensors and Bioelectronics 84 (2016): 126-132.
Chuang et al., in Point-of-Care Diagnostics—New Progresses and Perspectives, 2017, pp. 171-201.
De Jager, W. et al. "Solid-phase and bead-based cytokine immunoassay: a comparison." Methods 38.4 (2006): 294-303.
Dharuman, V., et al. "Label-free impedance detection of oligonucleotide hybridisation on interdigitated ultramicroelectrodes using electrochemical redox probes." Biosensors and Bioelectronics 21.4 (2005): 645-654.
Dhont, J. K. G., et al. "Electric-field-induced polarization and interactions of uncharged colloids in salt solutions." The European Physical Journal E 33.1 (2010): 51-68.
Duan, Y. Y., et al. (Mar. 2001). Factors determining and limiting the impedance behavior of implanted bioelectrodes. In Smart Structures and Devices (vol. 4235, pp. 498-508). SPIE.
Feicht, S. E. et al. "A mathematical model for electrical impedance spectroscopy of zwitterionic hydrogels." Soft matter 12.33 (2016): 7028-7037.
Ha, S., et al. "Microfluidic electric impedance spectroscopy for Malaria diagnosis." Proceedings of the 16th International Conference on Miniaturized Systems for Chemistry and Life Sciences. 2012 (3 pages).

(56) References Cited

OTHER PUBLICATIONS

Hardeman, St., et al. "Sensitivity of novel ultrathin platinum film immunosensors to buffer ionic strength." Sensors and Actuators B: Chemical 24.1-3 (1995): 98-102.
Jin, S., et al. "A Novel Impedimetric Microfluidic Analysis System for Transgenic Protein Cry1Ab Detection." Scientific Reports 7 (2017): 43175-43175.
Kato, G. B.. Impedance measurement platform for impedimetric biosensor. Diss. Massachusetts Institute of Technology, 2015 (65 pages).
Kaur, J., et al. "Atomic force spectroscopy-based study of antibody pesticide interactions for characterization of immunosensor surface." Biosensors and Bioelectronics 20.2 (2004): 284-293.
Kostal, E., et al. "Impedimetric characterization of interdigitated electrode arrays for biosensor applications." Multidisciplinary Digital Publishing Institute Proceedings 2.13 (2018): 899.
Lakey, A., et al. "Impedimetric array in polymer microfluidic cartridge for low cost point-of-care diagnostics." Biosensors and Bioelectronics 129 (2019): 147-154.
Li, H., et al. "CMOS electrochemical instrumentation for biosensor microsystems: A review." Sensors 17.1 (2016): 74.
Lisdat, F., et al. "The use of electrochemical impedance spectroscopy for biosensing." Analytical and bioanalytical chemistry 391.5 (2008): 1555-1567.
Liu, P. P., et al. "Magnetic relaxation detector for microbead labels." IEEE journal of solid-state circuits 47.4 (2012): 1056-1064.
Liu, Y., et al. "Biomolecules detection using a silver-enhanced gold nanoparticle-based biochip." Nanoscale research letters 5.3 (2010): 533-538.
Low, Y. K., et al. "Development of an ultrasensitive impedimetric immunosensor platform for detection of Plasmodium lactate dehydrogenase." Sensors 19.11 (2019): 2446.
Ma, H., et al. "An impedance-based integrated biosensor for suspended DNA characterization." Scientific Reports 3 (2013): 2730.
Mackay, S., et al. "Simulations of interdigitated electrode interactions with gold nanoparticles for impedance-based biosensing applications." Sensors 15.9 (2015): 22192-22208.
Montelius, L. et al. "Fabrication and characterization of a nanosensor for admittance spectroscopy of biomolecules." Journal of Vacuum Science & Technology A: Vacuum, Surfaces, and Films 13.3 (1995): 1755-1760.
Mulvaney, S. P., et al. "Rapid, femtomolar bioassays in complex matrices combining microfluidics and magnetoelectronics." Biosensors and Bioelectronics 23.2 (2007): 191-200.
Oki, A., et al. "pH Change of buffer solution in a microcapillary chip and its suppression." Electrophoresis 23.17 (2002): 2860-2864.
Pandey, C. M., et al. "Microfluidics based point-of-care diagnostics." Biotechnology journal 13.1 (2018): 1700047.
Peng, H., et al. "Electrochemical detection of DNA hybridization amplified by nanoparticles." Biosensors and Bioelectronics 21.9 (2006): 1727-1736.
Pierres, A. et al. "Measuring the Lifetime of Bonds Made between Surface-linked Molecules (?)." Journal of Biological Chemistry 270.44 (1995): 26586-26592.
Popa, C. et al. "The role of TNF-α in chronic inflammatory conditions, intermediary metabolism, and cardiovascular risk." Journal of lipid research 48.4 (2007): 751-762.
Santos, A., et al. "Fundamentals and applications of impedimetric and redox capacitive biosensors." J. Anal. Bioanal. Tech 7.016 (2014): S7.
Schramm, R. A., et al. "A novel impedance biosensor for measurement of trans-epithelial resistance in cells cultured on nanofiber scaffolds." Biosensors 7.3 (2017): 35.
Shin, K.-S., et al. "Sensitivity Enhancement of Bead-based Electrochemical Impedance Spectroscopy (BEIS) biosensor by electric field-focusing in microwells." Biosensors and Bioelectronics 85 (2016): 16-24.
Shrivastava, A. et al. "Spectrophotometric method for quantitative determination of triclabendazole in bulk and pharmaceutical." Chronicles of Young Scientists 2.2 (2011): 90-90.
Singh, K. V., et al. "3D nanogap interdigitated electrode array biosensors." Analytical and bioanalytical chemistry 397.4 (2010): 1493-1502.
Singh, K. V., et al. "Nanoparticle-enhanced sensitivity of a nanogap-interdigitated electrode array impedimetric biosensor." Langmuir 27.22 (2011): 13931-13939.
Skucha, K., et al. "A compact Hall-effect sensor array for the detection and imaging of single magnetic beads in biomedical assays." 2011 16th International Solid-State Sensors, Actuators and Microsystems Conference. IEEE, 2011, 1833-1836.
Skucha, K., et al. "Design considerations for CMOS-integrated Hall-effect magnetic bead detectors for biosensor applications." Journal of microelectromechanical systems 22.6 (2013): 1327-1338.
Sun, T. et al. "Single-colloidal particle impedance spectroscopy: Complete equivalent circuit analysis of polyelectrolyte microcapsules." Langmuir 26.6 (2010): 3821-3828.
Tekin, H. et al. "Attomolar protein detection using a magnetic bead surface coverage assay." Lab on a Chip 13.6 (2013): 1053-1059.
Japanese Patent Office. Notice of Reasons for Rejection for Application No. 2023-555753, dated Dec. 2, 2025 (7 pages with translation).

* cited by examiner

MICROFLUIDIC MICROPARTICLE-LABELED IMPEDANCE SENSOR ARRAY FOR ENHANCING BIOASSAY SENSITIVITY

CROSS-REFERENCE TO RELATED APPLICATIONS

This application claims priority to U.S. Provisional Patent Application No. 63/160,594, filed on Mar. 12, 2021, which is incorporated by reference herein in its entirety.

FEDERALLY SPONSORED RESEARCH

This invention was made with government support under grant number NSF-EECS/1509746 awarded by the National Science Foundation. The government has certain rights in the invention.

TECHNICAL FIELD

Described herein are devices and methods for improved detection and quantitation of biomolecules. Devices and methods may include a microfluidic biosensing platform for measuring electrical impedance changes in the presence of target analytes from sinusoidal input voltages to improve the sensitivity of immunoassays. In one embodiment, the described devices and methods may provide a point-of-care immunoassay platform for quantitative diagnostics using signal-enhancing microparticles to improve sensitivity and the limit-of-detection.

BACKGROUND

An impedimetric biosensor is a class of electrochemical biosensors that measures electrical impedance change due to the presence of biomolecules, cells, or labeled biomaterials on a working electrode by applying a sinusoidal voltage. These types of sensors have shown promise for digitalized point-of-care (POC) diagnostics due to low-cost, ease of miniaturization, multiplexing ability, and label-free operation. To date, much effort has been made in conjunction with developing a miniaturized platform with reduced complexity. Previous studies have developed integrated cell-counting assay systems for malaria diagnosis consisting of a microfluidic chip and a small impedance circuit board. Another integrated diagnostic platform was proposed to detect transgenic protein Cry1Ab that consisted of a printed gold electrode chip and a microfluidic flow cell. For a miniaturized and portable impedimetric biosensor platform, an impedimetric reader based on the AD5933 chip was designed with a microfluidic channel on IDE array for deep vein thrombosis and pulmonary embolism diagnosis. Although much effort has been done on developing a miniaturized impedance biosensor, an easy-to-use and integrated platform with sufficient sensitivity to conduct real immunoassays is poorly developed.

Capillary microfluidics have been utilized in different platforms to conduct different types of immunoassays. In one of the earliest studies, the possibility of an on-chip immunoassay was investigated using capillary-filling phenomena. To have an autonomous fluidic pathway, a capillary retention valve was introduced to sequentially deliver and enable multiple cycles. A one-step capillary-driven microfluidic was developed that enabled flow rate regulation to vary the incubation time in the reaction chamber by controlling channel geometry and thus hydraulic resistance. This compact device demonstrated a quantified immunoassay for C-reactive protein (CRP) with a minimum detectible fluorescent signal for 10 pg mL$^{-1}$ of CRP. Although these platforms have provided a paved route toward an autonomous microfluidic chip for running sensitive immunoassays, the combination of low sensitivity and the need for bulky downstream sensors to readout the output signals have hindered their development into commercially viable products.

Thus, what is needed are new integrated and user-friendly methods and devices for improved detection and quantitation of various biomarkers associated with disease. Such methods and devices would be useful in a variety of POC diagnostic applications.

SUMMARY

One embodiment described herein is a microfluidic device for detection and quantitation of biomolecules, the device comprising: (a) a microfluidic chip comprising: a multi-layer microfluidic network comprising a microfluidic channel, a buffer inlet, a sample inlet, and a waste outlet, wherein the buffer inlet, the sample inlet, and the waste outlet are in fluid communication with one another via the microfluidic channel, and wherein the microfluidic network is configured to receive a buffer solution and a sample; and a substrate layer comprising a surface having a first antibody covalently attached thereto, wherein the first antibody is adapted to specifically bind a target analyte, wherein the first antibody is attached between a first and a second electrode, and wherein the substrate layer is in fluid communication with the microfluidic channel, the first antibody being positioned within the microfluidic channel; and (b) a detector for detecting changes in electrical impedance.

In one aspect, the microfluidic network is comprised of a polymeric material selected from any one of polycarbonate (PC), polymethylmethacrylate (PMMA), cyclic olefin copolymer (COC), polyimide, polydimethylsiloxane (PDMS), or combinations thereof. In another aspect, the microfluidic network is comprised of PDMS.

In another aspect, the microfluidic network is geometrically dimensioned for autonomous capillary action flow of the buffer solution and the sample. In another aspect, the microfluidic network comprises a chamber layer positioned above the microfluidic channel, a capillary valve, and a bridging hole, wherein the chamber layer and the microfluidic channel are in fluid communication with one another via the capillary valve and the bridging hole, and wherein the sample inlet is positioned within the chamber layer. In another aspect, the chamber layer comprises a second antibody, wherein the second antibody is adapted to specifically bind the target analyte, and wherein the second antibody is conjugated to a microparticle. In another aspect, the second antibody comprises a biotin moiety, the microparticle comprises a streptavidin coating, and the second antibody is conjugated to the microparticle through binding of the biotin moiety to the streptavidin coating. In another aspect, the microparticle comprises a magnetic bead, a polystyrene bead, a silica bead, or a combination thereof. In another aspect, the microparticle has a size ranging from about 1 μm to about 5 μm in diameter. In another aspect, the microparticle comprises a magnetic bead having a size of about 2.8 μm in diameter. In another aspect, the chamber layer further comprises a porous polycarbonate (PC) membrane attached to the sample inlet, wherein the microparticle conjugated to the second antibody is immobilized on the porous PC membrane.

In another aspect, the capillary valve comprises an orifice having a size ranging from about 100 μm to about 300 μm in diameter. In another aspect, the capillary valve comprises an orifice having a size of about 250 μm in diameter. In another aspect, the bridging hole comprises an orifice having a size ranging from about 0.5 mm to about 2.5 mm in diameter. In another aspect, the bridging hole comprises an orifice having a size of about 1 mm in diameter.

In another aspect, the buffer solution comprises phosphate buffered saline (PBS) at a concentration ranging from about 0.001 mM to about 1 mM. In another aspect, the buffer solution comprises PBS at a concentration of about 0.01 mM. In another aspect, the buffer solution further comprises bovine serum albumin (BSA) at about 1 wt %.

In another aspect, the microfluidic network further comprises one or more absorbent pads.

In another aspect, the sample inlet further comprises a serum separation membrane.

In another aspect, the substrate layer comprises a glass substrate or a plastic substrate. In another aspect, the first and the second electrode are coated with an electroconductive metal. In another aspect, the electroconductive metal is selected from gold (Au), titanium (Ti), or a combination thereof. In another aspect, a distance between the first and the second electrode is from about 1 μm to about 10 μm. In another aspect, the distance between the first and the second electrode is about 10 μm. In another aspect, the first and the second electrode operate at a frequency ranging from about 1 kHz to about 100 kHz. In another aspect, the first and the second electrode operate at a frequency of about 10 kHz. In another aspect, the first and the second electrode are part of a plurality of electrodes, the plurality of electrodes being interdigitated.

Another embodiment described herein is a method for detecting and measuring the presence of a target analyte in a sample using any one of the disclosed device embodiments or aspects, the method comprising: (a) loading a buffer solution into the buffer inlet; (b) flowing the buffer solution over the substrate layer; (c) loading a sample into the sample inlet; (d) mixing the buffer solution with the sample; (e) sequentially flowing the mixture of buffer solution and sample over the substrate layer, wherein the target analyte binds to the first antibody; (f) continuously flowing the buffer solution over the substrate layer to remove any unbound target analyte; and (g) detecting a change in electrical impedance to quantify the concentration of target analyte in the sample.

In one aspect, the flowing is autonomous through capillary action. In another aspect, the sample is incubated with a microparticle conjugated to a second antibody before mixing with the buffer solution, wherein the target analyte binds to the microparticle-conjugated second antibody. In another aspect, the microparticle conjugated to the second antibody is immobilized on a porous PC membrane, wherein after loading the sample into the sample inlet, the sample drops the porous PC membrane, the microparticle is released from the membrane, and the sample is incubated with the released microparticle conjugated to the second antibody. In another aspect, the sample is loaded into the sample inlet after the buffer solution reaches a capillary valve. In another aspect, the capillary valve is opened when the sample contacts the buffer solution.

In another aspect, the sample comprises a blood sample or other biological fluid sample from a subject.

In another aspect, the method comprises a total assay time ranging from about 5 minutes to about 10 minutes.

DESCRIPTION OF THE DRAWINGS

FIG. 7A shows the forming of hydroxyl groups by oxygen plasma cleaning on a glass substrate. FIG. 7B shows 3% APTES incubation for 30 min after placing a removable PDMS masking film. FIG. 7C shows covalent immobilization of activated capture antibody by a carbodiimide coupling method. FIG. 7D shows incubation with the target analyte TNF-α and binding with the immobilized capture antibody. FIG. 7E shows removal of the mask and incorporation of the PDMS microfluidic channel. Diluted Phosphate Buffer Saline (PBS) with 1% w/v bovine serum albumin (BSA) (1% PBSB) solution was first injected through the microchannel and incubated for 30 minutes for BSA surface passivation. FIG. 7F shows the flow of detection antibody conjugated with magnetic microparticles and hydrodynamic washing. In FIG. 7F, a sandwich immunocomplex is formed between the immobilized capture antibody, target analyte, and detector antibody-conjugated microparticles.

FIG. 11A shows magnetic microparticle densities on the IDE for various target concentrations. FIG. 11B shows normalized impedance variations comparing capture antibodies with various target concentrations of TNF-α for both label-free (without magnetic microparticles) and sandwich microparticle-labeled (with magnetic microparticles) at 11 kHz. By coupling the impedance sensor with a microparticle-labeled immunoassay format, as low as 83.46 pg/mL of TNF-α was able to be detected. This combination sensing technique enables an order of magnitude of improved sensitivity. FIG. 11C shows a graph of impedance variations comparing capture antibodies (cAb) with various target concentrations of TNF-α for both label-free (cAb vs. TNF-α) and sandwich microparticle-labeled (cAb vs. Detector) at 11 kHz and includes the surface coverage % on the right axis.

DETAILED DESCRIPTION

Figure 1:
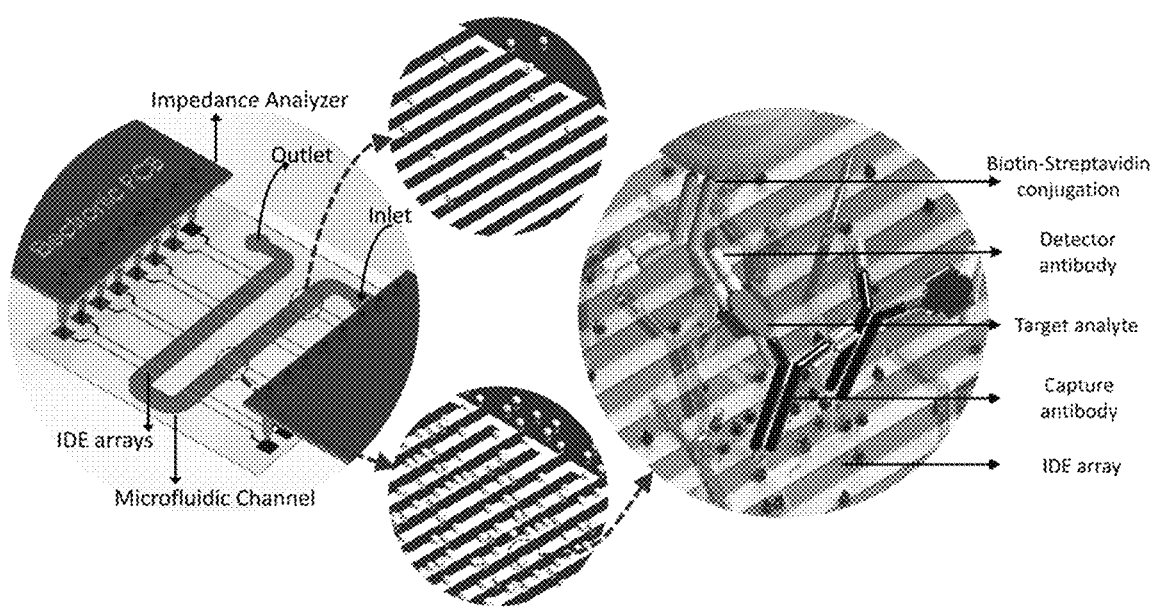
FIG. 1 shows a schematic diagram of an exemplary microfluidic impedance sensor array for microparticle-labeled immunoassays. Eight interdigitated electrodes (IDEs) integrated with custom-made impedance analyzers and a microfluidic channel are shown (left). An illustration of IDEs for negative (top) and positive (bottom) controls are shown, and the formation of a full immunocomplex on the IDE is presented (right).

Unless otherwise defined, all technical and scientific terms used herein have the same meaning as commonly understood by one of ordinary skill in the art. For example, any nomenclatures used in connection with, and techniques of, cell and tissue culture, molecular biology, immunology, microbiology, genetics, and protein and nucleic acid chemistry and hybridization described herein are well known and commonly used in the art. In case of conflict, the present disclosure, including definitions, will control. Exemplary methods and materials are described below, although methods and materials similar or equivalent to those described herein can be used in practice or testing of the embodiments and aspects described herein.

As used herein, the terms "amino acid," "nucleotide," "polynucleotide," "vector," "polypeptide," and "protein" have their common meanings as would be understood by a biochemist of ordinary skill in the art. Standard single letter nucleotides (A, C, G, T, U) and standard single letter amino acids (A, C, D, E, F, G, H, I, K, L, M, N, P, Q, R, S, T, V, W, or Y) are used herein.

As used herein, the terms such as "include," "including," "contain," "containing," "having," and the like mean "comprising." The present disclosure also contemplates other embodiments "comprising," "consisting of," and "consisting essentially of," the embodiments or elements presented herein, whether explicitly set forth or not.

As used herein, the term "a," "an," "the" and similar terms used in the context of the disclosure (especially in the context of the claims) are to be construed to cover both the singular and plural unless otherwise indicated herein or clearly contradicted by the context. In addition, "a," "an," or "the" means "one or more" unless otherwise specified.

As used herein, the term "or" can be conjunctive or disjunctive.

As used herein, the term "substantially" means to a great or significant extent, but not completely.

As used herein, the term "about" or "approximately" as applied to one or more values of interest, refers to a value that is similar to a stated reference value, or within an acceptable error range for the particular value as determined by one of ordinary skill in the art, which will depend in part on how the value is measured or determined, such as the limitations of the measurement system. In one aspect, the term "about" refers to any values, including both integers and fractional components that are within a variation of up to ±10% of the value modified by the term "about." Alternatively, "about" can mean within 3 or more standard deviations, per the practice in the art. Alternatively, such as with respect to biological systems or processes, the term "about" can mean within an order of magnitude, in some embodiments within 5-fold, and in some embodiments within 2-fold, of a value. As used herein, the symbol "~" means "about" or "approximately."

All ranges disclosed herein include both end points as discrete values as well as all integers and fractions specified within the range. For example, a range of 0.1-2.0 includes 0.1, 0.2, 0.3, 0.4 . . . 2.0. If the end points are modified by the term "about," the range specified is expanded by a variation of up to ±10% of any value within the range or within 3 or more standard deviations, including the end points.

As used herein, the terms "control," or "reference" are used herein interchangeably. A "reference" or "control" level may be a predetermined value or range, which is employed as a baseline or benchmark against which to assess a measured result. "Control" also refers to control experiments or control cells.

As used herein, the term "dose" denotes any form of an active ingredient formulation or composition, including cells, that contains an amount sufficient to initiate or produce a therapeutic effect with at least one or more administrations. "Formulation" and "composition" are used interchangeably herein.

As used herein, the term "prophylaxis" refers to preventing or reducing the progression of a disorder, either to a statistically significant degree or to a degree detectable by a person of ordinary skill in the art.

As used herein, the terms "effective amount" or "therapeutically effective amount," refers to a substantially non-toxic, but sufficient amount of an action, agent, composition, or cell(s) being administered to a subject that will prevent, treat, or ameliorate to some extent one or more of the symptoms of the disease or condition being experienced or that the subject is susceptible to contracting. The result can be the reduction or alleviation of the signs, symptoms, or causes of a disease, or any other desired alteration of a biological system. An effective amount may be based on factors individual to each subject, including, but not limited to, the subject's age, size, type or extent of disease, stage of the disease, route of administration, the type or extent of supplemental therapy used, ongoing disease process, and type of treatment desired.

As used herein, the term "subject" refers to an animal. Typically, the subject is a mammal. A subject also refers to primates (e.g., humans, male or female; infant, adolescent, or adult), non-human primates, rats, mice, rabbits, pigs, cows, sheep, goats, horses, dogs, cats, fish, birds, and the like. In one embodiment, the subject is a primate. In one embodiment, the subject is a human.

As used herein, a subject is "in need of treatment" if such subject would benefit biologically, medically, or in quality of life from such treatment. A subject in need of treatment does not necessarily present symptoms, particular in the case of preventative or prophylaxis treatments.

As used herein, the terms "inhibit," "inhibition," or "inhibiting" refer to the reduction or suppression of a given biological process, condition, symptom, disorder, or disease, or a significant decrease in the baseline activity of a biological activity or process.

As used herein, "treatment" or "treating" refers to prophylaxis of, preventing, suppressing, repressing, reversing, alleviating, ameliorating, or inhibiting the progress of biological process including a disorder or disease, or completely eliminating a disease. A treatment may be either performed in an acute or chronic way. The term "treatment" also refers to reducing the severity of a disease or symptoms associated with such disease prior to affliction with the disease. "Repressing" or "ameliorating" a disease, disorder, or the symptoms thereof involves administering a cell, composition, or compound described herein to a subject after clinical appearance of such disease, disorder, or its symptoms. "Prophylaxis of" or "preventing" a disease, disorder, or the symptoms thereof involves administering a cell, composition, or compound described herein to a subject prior to onset of the disease, disorder, or the symptoms thereof. "Suppressing" a disease or disorder involves administering a cell, composition, or compound described herein to a subject after induction of the disease or disorder thereof but before its clinical appearance or symptoms thereof have manifest.

As used herein, "sample" or "target sample" refers to any sample in which the presence and/or level of a target analyte or target biomarker is to be detected or determined. Samples may include liquids, solutions, emulsions, or suspensions. Samples may include a medical sample. Samples may include any biological fluid or tissue, such as blood, whole blood, fractions of blood such as plasma and serum, muscle, interstitial fluid, sweat, saliva, urine, tears, synovial fluid, bone marrow, cerebrospinal fluid, nasal secretions, sputum, amniotic fluid, bronchoalveolar lavage fluid, gastric lavage, emesis, fecal matter, lung tissue, peripheral blood mononuclear cells, total white blood cells, lymph node cells, spleen cells, tonsil cells, cancer cells, tumor cells, bile, digestive fluid, skin, or combinations thereof. In some embodiments, the sample comprises an aliquot. In other embodiments, the sample comprises a biological or bodily fluid. Samples can be obtained by any means known in the art. The sample can be used directly as obtained from a patient or can be pre-treated, such as by filtration, distillation, extraction, concentration, centrifugation, inactivation of interfering components, addition of reagents, and the like, to modify the character of the sample in some manner as discussed herein or otherwise as is known in the art. In one embodiment, a sample comprises a blood sample or other biological fluid sample from a subject.

As used herein, "target analyte" or "target biomarker" refers to a substance that is associated with a biological state or a biological process, such as a disease state or a diagnostic or prognostic indicator of a disease or disorder (e.g., an indicator identifying the likelihood of the existence or later development of a disease or disorder). The presence or absence of a biomarker, or the increase or decrease in the concentration of a biomarker, can be associated with and/or be indicative of a particular state or process. Biomarkers can include, but are not limited to, cells or cellular components (e.g., a viral cell, a bacterial cell, a fungal cell, a cancer cell, etc.), small molecules, lipids, carbohydrates, nucleic acids, peptides, proteins, enzymes, antigens, and antibodies. A biomarker can be derived from an infectious agent, such as a bacterium, fungus or virus, or can be an endogenous molecule that is found in greater or lesser abundance in a subject suffering from a disease or disorder as compared to a healthy individual (e.g., an increase or decrease in expression of a gene or gene product). In one embodiment, the target analyte is from a blood sample or a serum sample from a subject.

As used herein, "microfluidic" refers to refers to the behavior, precise control, and manipulation of fluids that are geometrically and dimensionally constrained to a small scale (typically sub-millimeter) at which surface forces dominate volumetric forces. "Microfluidic device" refers to a device or circuit comprising at least one microchannel having a cross-sectional dimension of less than 1 millimeter. In some embodiments of the disclosed invention, the microfluidic device may comprise a multi-layered microfluidic chip.

As used herein, "impedance" is the electrical impedance or electronic impedance. As used herein, "detecting changes in electrical impedance" or "detecting impedance variation" means that the impedance between or among one or more electrodes would have a significant change that can be detected by an impedance analyzer or impedance measurement circuit when a molecular binding reaction occurs between or among said electrodes. The impedance change or impedance variation refers to the difference in impedance values when a molecular binding reaction occurs between one or more electrodes of the device and when no molecular binding reaction occurs. Impedance between or among electrodes is typically a function of the frequency of the applied electric field or sinusoidal input voltage for detection and measurement.

As used herein, "limit of detection" or "LOD" means the lowest signal, or the lowest corresponding quantity to be determined from the signal, that can be observed with a sufficient degree of confidence or statistical significance. In certain embodiments of the disclosed invention, the lowest concentration of a target analyte that can be reliably detected is reported as: $[LOD=[mean_{blank}+1.645\times(SD_{blank})]+1.645\times(SD_{low\ concentration\ sample})]$.

As used herein, "interdigitated" refers to a structure having projections coming one direction that interlace with projections coming from a different direction in the manner of the fingers of folded hands. In one aspect of the disclosed invention, a first and a second electrode are part of a plurality of electrodes, the plurality of electrodes being interdigitated. Interdigitated electrode (IDE) elements of the present application preferably do not contact one another. In one aspect of the disclosed invention, a distance between a first and a second electrode is from about 1 μm to about 10 μm. In another aspect, the distance between the first and the second electrode is about 10 μm. In one embodiment, disclosed devices comprise an IDE array.

As used herein, "electroconductive metal" refers to any metal having the ability to conduct an electric current. In one embodiment, the electroconductive metal may be selected from any one of gold (Au), titanium (Ti), aluminum (Al), copper (Cu), silver (Ag), zinc (Zn), iron (Fe), nickel (Ni), cobalt (Co), or combinations thereof. In some embodiments, an electroconductive metal may be deposited and coated onto one or more electrodes of the disclosed devices. In one embodiment, a first and a second electrode are coated with an electroconductive metal. In another embodiment, the electroconductive metal is selected from gold (Au), titanium (Ti), or a combination thereof.

As used herein, "bioassay" refers to a biochemical test for detecting the presence and/or measuring the concentration of a target analyte or target biomolecule in a solution through the use of one or more biomolecules including, for example, antibodies or single stranded DNA (ssDNA). In one embodiment, the bioassay comprises an immunoassay including a first "capture antibody" or "cAb" that is covalently attached or immobilized onto a substrate layer to bind and capture a target analyte in solution. In one aspect of this embodiment, the immunoassay further includes a second "detector antibody" or "dAb" that is used to generate a sandwich immunoassay by binding onto the target analyte that is captured by the first capture antibody.

As used herein, "specifically bind" generally refers to when an antibody is adapted to bind to a target analyte more readily than it would bind to a random, unrelated biomolecule or analyte.

In some embodiments of the disclosed invention, an impedimetric immunoassay biosensor device is described to measure electrical impedance changes in the presence of biomolecules from sinusoidal input voltages. To improve the sensitivity of impedimetric biosensors, several design parameters have been considered. Typically, an IDE is used for impedimetric biosensors because they have the advantages of high signal-to-noise ratio, low ohmic drop, and fast attainment of steady-state. Critical parameters of an IDE design are the sensing area, electrode gap, and frequency range. The design of the IDE array itself can increase the overall sensitivity of IDEs due to considerations of the overall sensing area. Electrode gap is the most significant parameter on the sensitivity of IDE biosensors since the electric field between two electrodes can effectively be changed during biomolecular binding events. The sensitivity will further increase when the distance between the two electrodes decreases from micro-gap into nano-gaps. As the distance between electrodes becomes smaller, the chances of short-circuiting of the electrodes by the sample as well as labels increase, which can result in failed measurements. It should be also noticed that nano-gaps will require a buffer solution with a very low ionic strength to maintain a proper baseline, which can affect the antigen-antibody interaction. Additionally, nano-gap IDEs require complex fabrication procedures, resulting in higher manufacturing costs, lower yield rate, and lower practicality. Therefore, the typical gap between the electrode fingers for biosensing platforms is suggested to be 1-10 μm.

The selection of an appropriate frequency is another key parameter associated with assay sensitivity. At lower frequencies (<1 kHz), the impedance is dominated by the leakage resistance of the IDEs, which is highly sensitive to the electrode material. For high frequencies above 100 kHz, solution resistance contributes to the net impedance, and measurement errors increase from parasitic capacitances and inductances. In the mid frequencies (1 kHz~100 kHz), the measurement signals rely on the electrode surface capacitance allowing the affinity binding on the IDEs to be detected. Therefore, most impedimetric biosensors adopt a frequency between 1 kHz to 100 kHz, commonly around 10 kHz, where the signal is relatively stable, and the impedance response is dominated by the interfacial changes. In one embodiment, a first and a second electrode operate at a frequency ranging from about 1 kHz to about 100 kHz. In another embodiment, the first and the second electrode operate at a frequency of about 10 kHz.

Any biosensors aiming to detect biomolecules should include a signal interpretation element to recognize the interfacial event in the reaction chamber. This element is typically integrated with a microfluidic biochip in POC devices and can be miniaturized in a real portable and practical device. An impedimetric biosensor is an ideal candidate owing to high sensitivity, improved signal to noise ratio, and convenient integration, providing digitalized signals and facilitating the communication. IDEs, which are used in well-established bioelectrical sensors, fall within the category of microelectrodes and have been utilized widely in POC platforms due to their unique advantages of real-time recognition, low ohmic drop, and fast establishment of steady state. IDEs consist of a series of electrode fingers, usually ranging in micrometer size, that detect the interfacial bioreaction by applying sinusoidal current.

There are two distinct approaches to improve overall immunoassay performance using these types of impedance-based biosensors. By coating gold nanoparticles on an IDE electrochemically, overall surface area of the electrodes increases significantly so that signal-to-noise ratio is promoted to detect target analytes. Even though this approach shows proper improvement on sensitivity, the extensive surface preparation for IDE and biofunctionalization and further fabrication steps limits the potential for more compelling POC platforms. Another approach is to use micro/nanoparticles to improve overall sensitivity. The overall sensitivity of impedimetric biosensors can be improved by using microparticles or nanoparticles as a label to amplify impedance signals by inducing interfacial changes. Although labeling with particles in electrochemical biosensors has been widely used, it should be noted that data recording under the buffer solution PBS is better since electrochemical buffers being used for faradic measurements usually act as a mild oxidant that can denature some proteins. Additionally, microparticle-labeling in non-faradaic (or capacitive) biosensors are inherently simpler and more amenable for POC testing with the ability to make measurements related to the change in interfacial capacitance during the affinity binding, without redox reaction to be completed, as is required in faradic biosensors.

Several studies have demonstrated the effects of particle size and material on detection sensitivity. From theoretical analysis, labeling particles can effectively block the electric fringing fields, resulting in an increment of impedance with respect to the width and gap of the IDEs. With this principle, a sandwich immunoassay for quantifying carcinoembryonic antigen was conducted using gold nanoparticles (GNP), and a detection limit of 1 ng/mL was achieved. Similarly, a real-time impedance-based immunosensor conjugating Galectin-1 antibodies to alumina nanoparticles was used to improve sensitivity and immobilization efficiency for quantifying of Galectin-1 protein. Even though labeling with these particles has been utilized in various assays to improve the sensitivity, overall achievements are insignificant due to a lack of understanding of the effect of these particles, comparison of the signal enhancement with labeling, and implementing proper immunoassay procedures.

A typical microparticle-based assay requires a microfluidic channel to induce controllable hydrodynamic forces. It is found that hydrodynamic forces between 0.1 and 10 pN can rupture non-specific bonds and that those between 6 and 250 pN preserve specific bonds. Therefore, exploiting the controlled hydrodynamic washing forces imposed by the flow velocity in a microfluidic channel is critical to knock down non-specifically bound or unbound target analytes or microparticles from an IDE array, improving the overall signal to noise ratio.

With these concepts using microparticle-based signal enhancement and a microfluidic system, a miniaturized impedimetric biosensor can be developed including all necessary components for immunoassays within a single platform. In one embodiment, this device platform comprises a gold IDE array chip for multiplexed assays, a small custom-made 8-channel impedance analyzer connected to a semi-real time data acquisition software, and a microfluidic channel network for sample delivery and hydrodynamic washing purposes.

In some embodiments, microfluidic networks are fabricated to create microfluidic channels, capillary valves, bridging holes, reservoirs, reaction areas, inlets, and outlets by one or more of laser cutting, injection molding, die cutting, milling, press cutting, layer-by-layer fabrication, 3D printing, photolithography, or combinations thereof. In one embodiment, the microfluidic network may be geometrically dimensioned for autonomous capillary action flow of immunoassay reagents such as a buffer solution and a sample.

Capillary-driven microfluidics utilize surface tension to drive liquids in channels and can be controlled by adjusting the channel geometries. This technology employs a passive method of capillary-driven microfluidics for reagent flowing. This passive flow handling method is independent of any external peripheral equipment and therefore demonstrates the evolving capabilities for miniaturized POC platforms. True capillary-driven microfluidic platforms are described as autonomous fluidic circuits that are usually combined with different capillary elements such as capillary-pumps, capillary-stop-valves (CSVs), and trigger-valves.

In some embodiments, CSVs are described that are designed to stop the liquid in the microchannel based on the surface characteristics with a sudden geometrical change. A sudden enlargement in the cross-section of microchannels decreases the driving force imposed by the capillary effect and stops the liquid when a liquid forehead reaches to the point. These CSVs are easy to fabricate and are a reliable passive element in capillary-driven microfluidics. However, active duration, surface contact angles, and geometries should carefully be investigated to prevent corner flow, bubble trapping, and functionality stopping. Two-level stop valves have been developed to improve the reliability of stop valves with hydrophilic silicon microchannels covered by hydrophobic PDMS. The burst pressure of these stop valves was numerically and experimentally studied considering the microchannel dimensions and liquid contact angle. Stop valves can readily be modified into capillary trigger valves in the intersection of two perpendicular channels. In this configuration, liquid from a channel is stopped at the intersection until the other liquid reaches that point from the orthogonal channel. Once the intersection is wetted by the liquid in the straight channels, capillary force drives the flow into the channel and the two fluids mix in the common downstream channel. To enhance the functionality of the stop-valve and reduce fabrication restraints, a two-layer trigger valve has previously been introduced for higher reliability and robustness and was tested to stop the fluid up to 30 minutes. Although these previous advancements in the design of autonomous capillary-driven microfluidics were a golden achievement, further investigation is needed for better control on the influenced parameters. Also, only a small number of studies have been implemented to test these flow control elements in a real immunoassay with a reliable application for POC.

In one embodiment, a capillary-driven microfluidics platform is described for microparticle-labeled immunoassays that is integrated with a hand-held impedance analyzer. For effective fluid manipulation, a vertical CSV can be introduced that connects two stages or layers of microfluidics. This CSV allows the reagents to be infused into a first stage when the fluid reaches to the point after being prepared in an upper microfluidic stage or chamber. The concept of two-stage microfluidics not only allows for the design of a miniaturized microfluidic device, but it also grants the addition of convenient pre-treatment incubation steps. By characterizing the fluidic parameters, the overall time for a detection assay (e.g., human troponin I) can be completed in less than 6 minutes with this integrated platform.

One embodiment described herein is a microfluidic device for detection and quantitation of biomolecules, the device comprising: (a) a microfluidic chip comprising: a multi-layer microfluidic network comprising a microfluidic channel, a buffer inlet, a sample inlet, and a waste outlet, wherein the buffer inlet, the sample inlet, and the waste outlet are in fluid communication with one another via the microfluidic channel, and wherein the microfluidic network is configured to receive a buffer solution and a sample; and a substrate layer comprising a surface having a first antibody or capture antibody covalently attached thereto, wherein the first antibody is adapted to specifically bind a target analyte, wherein the first antibody is attached between a first and a second electrode, and wherein the substrate layer is in fluid communication with the microfluidic channel, the first antibody being positioned within the microfluidic channel; and (b) a detector for detecting changes in electrical impedance.

In some embodiments, microfluidic networks are described that comprise hydrophilic polymeric material comprising one or more of polyacrylic acid, polymethylmethacrylate (PMMA), polycarbonate (PC), cyclic olefin copolymer (COC), polyimide, polydimethylsiloxane (PDMS), polyester, nylon, polyvinyl chloride, polyethylene, polypropylene, polyethylene terephthalate glycol, polybutylene adipate terephthalate, ethylene tetrafluoroethylene, fluorinated ethylene propylene, perfluoro alkoxy alkane, polylactic acid, polycaprolactone, polyoxymethylene, cellulose, co-polymers thereof, or combinations thereof. In one embodiment, the microfluidic network is comprised of a polymeric material selected from any one of PC, PMMA, COC, polyimide, PDMS, or combinations thereof. In another embodiment, the microfluidic network is comprised of PDMS.

Polymeric materials such as PDMS are typically hydrophobic. In certain embodiments of the disclosed invention, surface modification techniques including layer-by-layer (LBL) deposition, deposition of polyvinyl alcohol (PVA) following oxygen plasma treatment, or poly(ethylene glycol) coating production can be performed on the polymeric material surfaces to finely control the hydrophilicity of the polymeric material and regulate the overall flow rate of the microfluidic network. In one embodiment, the modification may involve BSA deposition on the PDMS or substrate surface. In another embodiment, the modification may involve oxygen plasma treatment of the PDMS or substrate surface. Plasma oxidation treatment can be used to alter the PDMS or substrate surface chemistry by adding silanol (SiOH) groups to the surface. Atmospheric air plasma and argon plasma work for this plasma treatment application. The plasma treatment renders the PDMS surface more hydrophilic, allowing aqueous solutions to maintain surface wetness. The oxidized surface can be further functionalized by reaction with trichlorosilanes. Alternatively, for applications where long-term hydrophilicity is a requirement, techniques such as hydrophilic polymer grafting, surface nano structuring, and dynamic surface modification with embedded surfactants can also be used.

In one embodiment, a microfluidic network may comprise a chamber layer positioned above a microfluidic channel, a capillary valve, and a bridging hole, wherein the chamber layer and the microfluidic channel are in fluid communication with one another via the capillary valve and the bridging hole, and wherein the sample inlet is positioned within the chamber layer. In one aspect, the capillary valve comprises an orifice having a size ranging from about 100 μm to about 300 μm in diameter. In another aspect, the capillary valve comprises an orifice having a size of about 250 μm in diameter. In another aspect, the bridging hole comprises an orifice having a size ranging from about 0.5 mm to about 2.5 mm in diameter. In another aspect, the bridging hole comprises an orifice having a size of about 1 mm in diameter.

In another embodiment, the chamber layer comprises a second antibody or detector antibody, wherein the second antibody is adapted to specifically bind the target analyte, and wherein the second antibody is conjugated to a microparticle. In one aspect, the second antibody comprises a biotin moiety, the microparticle comprises a streptavidin coating, and the second antibody is conjugated to the microparticle through binding of the biotin moiety to the streptavidin coating. In another aspect, the microparticle comprises a magnetic bead, a polystyrene bead, a silica bead, or a combination thereof. In another aspect, the microparticle has a size ranging from about 1 μm to about 5 μm in diameter. In another aspect, the microparticle comprises a magnetic bead having a size of about 2.8 μm in diameter. In another aspect, the chamber layer further comprises a porous polycarbonate (PC) membrane attached to the sample inlet, wherein the microparticle conjugated to the second antibody is immobilized on the porous PC membrane.

Another embodiment described herein is a method for detecting and measuring the presence of a target analyte in a sample using any one of the disclosed device embodiments or aspects, the method comprising: (a) loading a buffer solution into the buffer inlet; (b) flowing the buffer solution over the substrate layer; (c) loading a sample into the sample inlet; (d) mixing the buffer solution with the sample; (e) sequentially flowing the mixture of buffer solution and sample over the substrate layer, wherein the target analyte binds to the first antibody or capture antibody; (f) continuously flowing the buffer solution over the substrate layer to remove any unbound target analyte; and (g) detecting a change in electrical impedance to quantify the concentration of target analyte in the sample. In one aspect, the flowing is autonomous through capillary action. In another aspect, the sample is incubated with a microparticle conjugated to a second antibody or detector antibody before mixing with the buffer solution, wherein the target analyte binds to the microparticle-conjugated second antibody. In another aspect, the microparticle conjugated to the second antibody is immobilized on a porous PC membrane, wherein after loading the sample into the sample inlet, the sample drops the porous PC membrane, the microparticle is released from the membrane, and the sample is incubated with the released microparticle conjugated to the second antibody. In another aspect, the sample is loaded into the sample inlet after the buffer solution reaches a capillary valve. In another aspect, the capillary valve is opened when the sample contacts the buffer solution. In another aspect, the method comprises a total assay time ranging from about 5 minutes to about 10 minutes.

In one embodiment, a portable impedimetric biosensor device is described that is used to measure electrical impedance changes in the presence of biomolecules from sinusoidal input voltages. The portable impedance-based biosensor platform can improve the sensitivity and LOD of immunoassays using microparticles as a label. In one embodiment, a 2×4 IDE array is described having a 10/10 μm electrode/gap and a miniaturized impedance analyzer. Immunoassays with microparticles can be performed by integrating a microfluidic channel to evaluate signal enhancement. As described herein, three different types of microparticles were tested at a fixed size to determine the effect of material property and surface charges on the readout sensitivity. To understand the material dependency of microparticles on the sensor array, magnetic, silica, and polystyrene microparticles were tested. Among these microparticles, magnetic microparticles presented high signal enhancement with relevant stability from the sensor array. With the magnetic microparticles, a series of immunoassays is demonstrated to detect human TNF-α, and the level of signal enhancement is compared by measuring the LOD. Based on preliminary testing, magnetic microparticles show optimal performance in labeling for the TNF-α immunoassay. Anti-human TNF-α antibodies can be covalently bonded onto the IDE surface through EDC/s-NHS-mediated bioconjugation. Different concentrations of the target analytes and anti-TNF-α antibodies conjugated with magnetic microparticles are introduced as a detector. By obtaining immunosensor responses (normalized impedance variation) from surface coverage of microparticles settling on IDEs, the limit of detection (LOD) can be improved 10-fold from 0.99 ng/mL for label-free detection to 83 pg/mL for microparticle-labeling detection in this immunoassay.

It will be apparent to one of ordinary skill in the relevant art that suitable modifications and adaptations to the compositions, formulations, methods, processes, and applications described herein can be made without departing from the scope of any embodiments or aspects thereof. The compositions and methods provided are exemplary and are not intended to limit the scope of any of the specified embodiments. All of the various embodiments, aspects, and options disclosed herein can be combined in any variations or iterations. The scope of the compositions, formulations, methods, and processes described herein include all actual or potential combinations of embodiments, aspects, options, examples, and preferences herein described. The exemplary compositions and formulations described herein may omit any component, substitute any component disclosed herein, or include any component disclosed elsewhere herein. The ratios of the mass of any component of any of the compositions or formulations disclosed herein to the mass of any other component in the formulation or to the total mass of the other components in the formulation are hereby disclosed as if they were expressly disclosed. Should the meaning of any terms in any of the patents or publications incorporated by reference conflict with the meaning of the terms used in this disclosure, the meanings of the terms or phrases in this disclosure are controlling. Furthermore, the foregoing discussion discloses and describes merely exemplary embodiments. All patents and publications cited herein are incorporated by reference herein for the specific teachings thereof.

Various embodiments and aspects of the inventions described herein are summarized by the following clauses:

Clause 1. A microfluidic device for detection and quantitation of biomolecules, the device comprising:
(a) a microfluidic chip comprising:
a multi-layer microfluidic network comprising a microfluidic channel, a buffer inlet, a sample inlet, and a waste outlet, wherein the buffer inlet, the sample inlet, and the waste outlet are in fluid communication with one another via the microfluidic channel, and wherein the microfluidic network is configured to receive a buffer solution and a sample; and
a substrate layer comprising a surface having a first antibody covalently attached thereto, wherein the first antibody is adapted to specifically bind a target analyte, wherein the first antibody is attached between a first and a second electrode, and wherein the substrate layer is in fluid communication with the microfluidic channel, the first antibody being positioned within the microfluidic channel; and
(b) a detector for detecting changes in electrical impedance.

Clause 2. The device of clause 1, wherein the microfluidic network is comprised of a polymeric material selected from any one of polycarbonate (PC), polymethylmethacrylate (PMMA), cyclic olefin copolymer (COC), polyimide, polydimethylsiloxane (PDMS), or combinations thereof.

Clause 3. The device of clause 2, wherein the microfluidic network is comprised of PDMS.

Clause 4. The device of any one of clauses 1-3, wherein the microfluidic network is geometrically dimensioned for autonomous capillary action flow of the buffer solution and the sample.

Clause 5. The device of clause 4, wherein the microfluidic network comprises a chamber layer positioned above the microfluidic channel, a capillary valve, and a bridging hole, wherein the chamber layer and the microfluidic channel are in fluid communication with one another via the capillary valve and the bridging hole, and wherein the sample inlet is positioned within the chamber layer.

Clause 6. The device of clause 5, wherein the chamber layer comprises a second antibody, wherein the second antibody is adapted to specifically bind the target analyte, and wherein the second antibody is conjugated to a microparticle.

Clause 7. The device of clause 6, wherein the second antibody comprises a biotin moiety, the microparticle comprises a streptavidin coating, and the second antibody is conjugated to the microparticle through binding of the biotin moiety to the streptavidin coating.

Clause 8. The device of clause 6 or 7, wherein the microparticle comprises a magnetic bead, a polystyrene bead, a silica bead, or a combination thereof.

Clause 9. The device of clause 8, wherein the microparticle has a size ranging from about 1 μm to about 5 μm in diameter.

Clause 10. The device of clause 9, wherein the microparticle comprises a magnetic bead having a size of about 2.8 μm in diameter.

Clause 11. The device of any one of clauses 6-10, wherein the chamber layer further comprises a porous polycarbonate (PC) membrane attached to the sample inlet, and wherein the microparticle conjugated to the second antibody is immobilized on the porous PC membrane.

Clause 12. The device of any one of clauses 5-11, wherein the capillary valve comprises an orifice having a size ranging from about 100 μm to about 300 μm in diameter.

Clause 13. The device of clause 12, wherein the capillary valve comprises an orifice having a size of about 250 μm in diameter.

Clause 14. The device of any one of clauses 5-13, wherein the bridging hole comprises an orifice having a size ranging from about 0.5 mm to about 2.5 mm in diameter.

Clause 15. The device of clause 14, wherein the bridging hole comprises an orifice having a size of about 1 mm in diameter.

Clause 16. The device of any one of clauses 1-15, wherein the buffer solution comprises phosphate buffered saline (PBS) at a concentration ranging from about 0.001 mM to about 1 mM.

Clause 17. The device of clause 16, wherein the buffer solution comprises PBS at a concentration of about 0.01 mM.

Clause 18. The device of clause 16 or 17, wherein the buffer solution further comprises bovine serum albumin (BSA) at about 1 wt %.

Clause 19. The device of any one of clauses 1-18, wherein the microfluidic network further comprises one or more absorbent pads.

Clause 20. The device of any one of clauses 1-19, wherein the sample inlet further comprises a serum separation membrane.

Clause 21. The device of any one of clauses 1-20, wherein the substrate layer comprises a glass substrate or a plastic substrate.

Clause 22. The device of any one of clauses 1-21, wherein the first and the second electrode are coated with an electroconductive metal.

Clause 23. The device of clause 22, wherein the electroconductive metal is selected from gold (Au), titanium (Ti), or a combination thereof.

Clause 24. The device of any one of clauses 1-23, wherein a distance between the first and the second electrode is from about 1 µm to about 10 µm.

Clause 25. The device of clause 24, wherein the distance between the first and the second electrode is about 10 µm.

Clause 26. The device of any one of clauses 1-25, wherein the first and the second electrode operate at a frequency ranging from about 1 kHz to about 100 kHz.

Clause 27. The device of clause 26, wherein the first and the second electrode operate at a frequency of about 10 kHz.

Clause 28. The device of any one of clauses 1-27, wherein the first and the second electrode are part of a plurality of electrodes, the plurality of electrodes being interdigitated.

Clause 29. A method for detecting and measuring the presence of a target analyte in a sample using the device of any one of clauses 1-28, the method comprising:

(a) loading a buffer solution into the buffer inlet;

(b) flowing the buffer solution over the substrate layer;

(c) loading a sample into the sample inlet;

(d) mixing the buffer solution with the sample;

(e) sequentially flowing the mixture of buffer solution and sample over the substrate layer, wherein the target analyte binds to the first antibody;

(f) continuously flowing the buffer solution over the substrate layer to remove any unbound target analyte; and (g) detecting a change in electrical impedance to quantify the concentration of target analyte in the sample.

Clause 30. The method of clause 29, wherein flowing is autonomous through capillary action.

Clause 31. The method of clause 29 or 30, wherein the sample is incubated with a microparticle conjugated to a second antibody before mixing with the buffer solution, wherein the target analyte binds to the microparticle-conjugated second antibody.

Clause 32. The method of clause 31, wherein the microparticle conjugated to the second antibody is immobilized on a porous PC membrane, wherein after loading the sample into the sample inlet, the sample drops the porous PC membrane, the microparticle is released from the membrane, and the sample is incubated with the released microparticle conjugated to the second antibody.

Clause 33. The method of any one of clauses 29-32, wherein the sample is loaded into the sample inlet after the buffer solution reaches a capillary valve.

Clause 34. The method of clause 33, wherein the capillary valve is opened when the sample contacts the buffer solution.

Clause 35. The method of any one of clauses 29-34, wherein the sample comprises a blood sample or other biological fluid sample from a subject.

Clause 36. The method of any one of clauses 29-35, wherein the method comprises a total assay time ranging from about 5 minutes to about 10 minutes.

EXAMPLES

Example 1

Design of the Impedance Sensing Platform

Impedance based immunosensors utilize the formation of an immunocomplex (e.g., antibody as a bioreceptor and specific antigen as its corresponding analyte) in a thin film configuration on an electrode surface. This complex formation alters the interfacial capacitance and resistance at the electrode/electrolyte interface. The electrical impedance signal is expressed as the ratio of the voltage phasor to the electric current phasor. The discrepancy between these two phasors occurs when electric fields on the sensing electrode are disrupted and/or altered by the presence of biomolecules at the electrode interface. Here, a custom-made microfluidic impedance measurement system was designed, as shown in FIG. 1, consisting of a gold (Au) IDE array chip, an impedance analyzing circuit, a data acquisition (DAQ) board associated with a LabVIEW software, and a microfluidic channel.

Figure 2A:
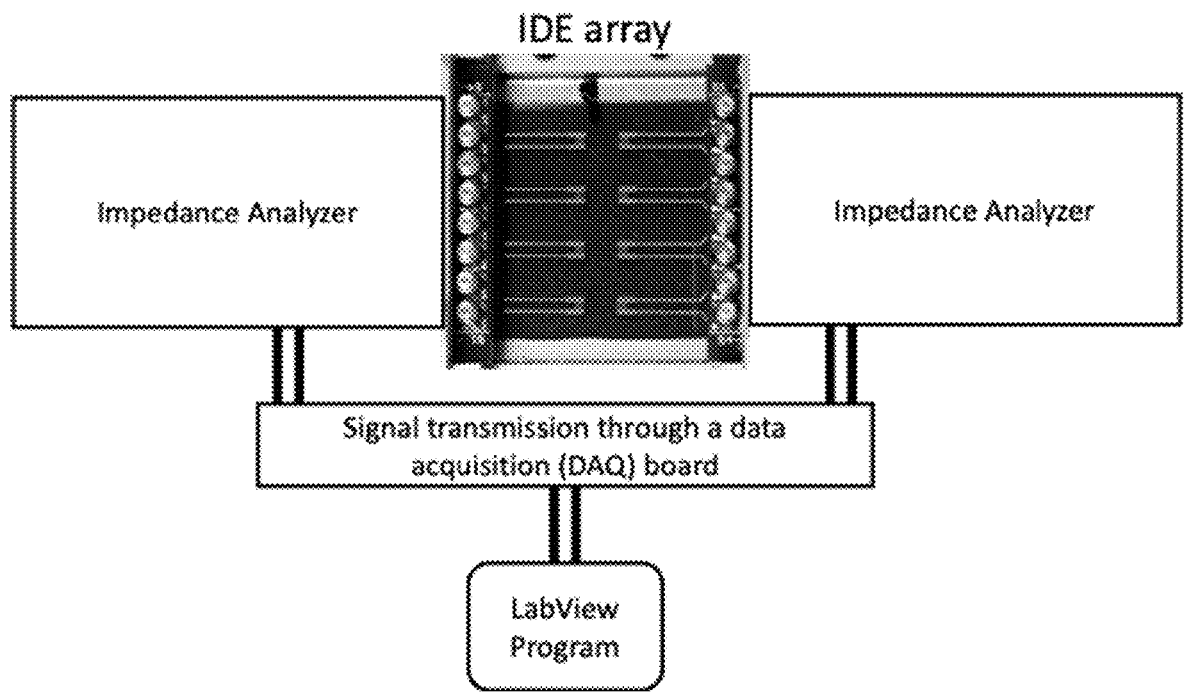
FIG. 2A shows an exemplary system setup consisting of a gold (Au) IDE array chip, two impedance analyzing circuits, and a data acquisition (DAQ) board for signal transmission that is associated with a LabVIEW software program. A microfluidic channel network can be placed on top of the IDE array to deliver the analytes and buffer solutions and control the hydrodynamic forces for washing.
Figure 2B:
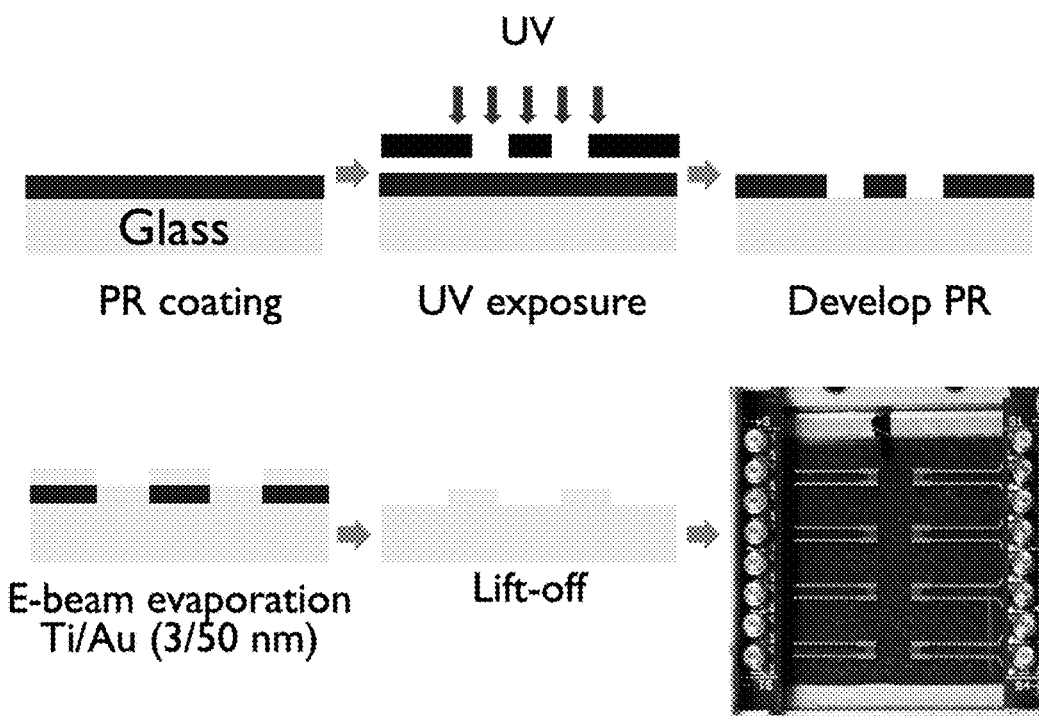
FIG. 2B shows a schematic for an exemplary IDE chip fabrication process.
Figure 2C:
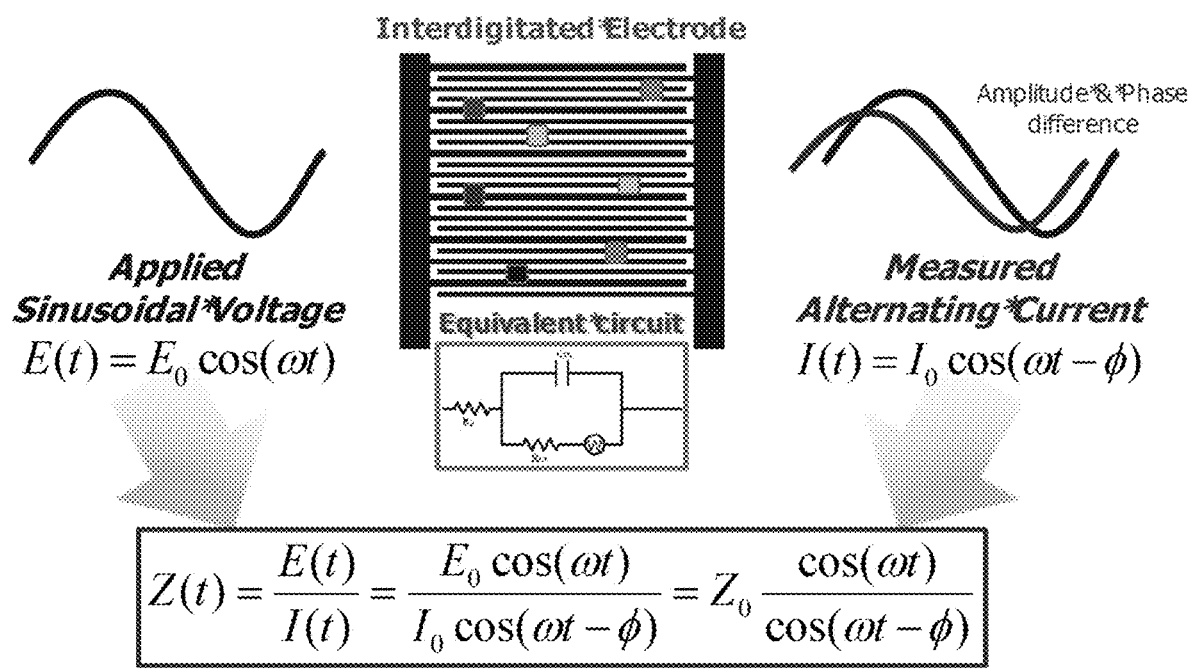
FIG. 2C shows an illustration of an IDE and an equivalent circuit, and equations for how the IDE measures impedance variations from the applied sinusoidal voltage and measured alternating current.
Figure 3:
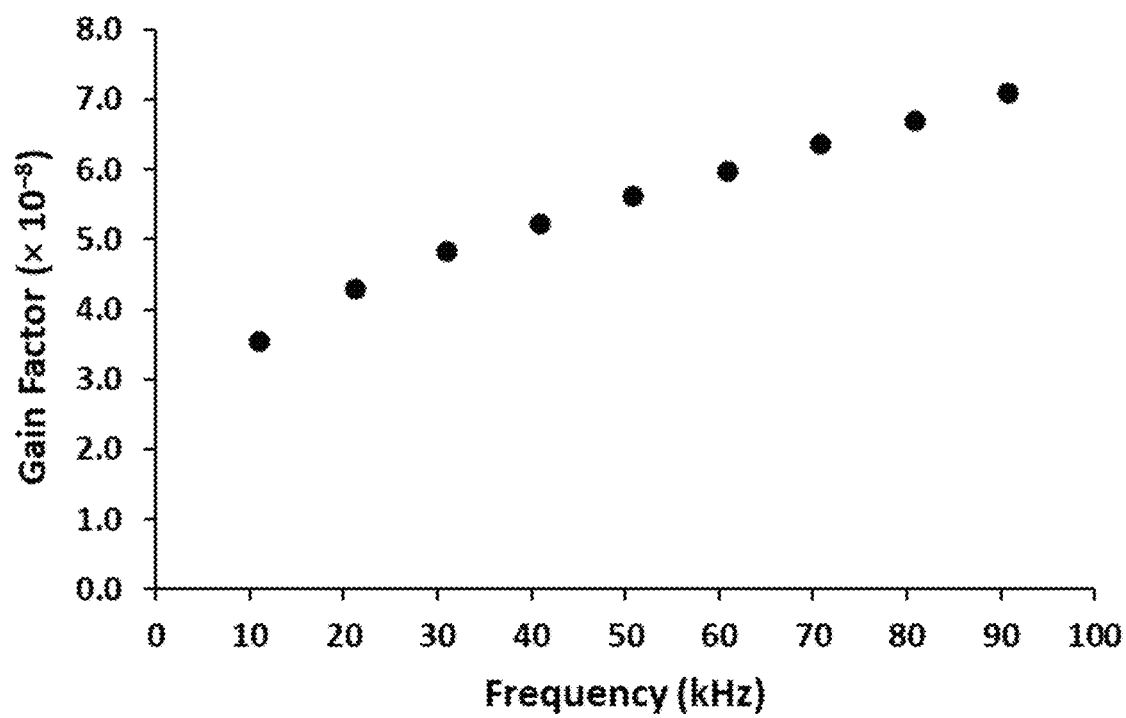
FIG. 3 shows the gain factor calculated for different frequencies based on measurements by the impedance analyzer and LCR meter on different concentrations of PBS buffer.

The Au IDE array chip having about a finger width and spacing of 10 µm between electrodes was fabricated on a glass wafer based on a conventional photolithography process and Ti/Au deposition to generate eight sets of IDEs on a square glass chip about 30×30 mm in size. Electrical impedance in the analyzer circuit is measured by a 12-bit impedance converter chip, AD 5933 (Analog Devices Inc.). A detailed sketch of the setup is illustrated in FIG. 2A. A schematic for an exemplary IDE chip fabrication process is shown in FIG. 2B. A glass substrate is first coated with a photoresist (PR) material. The PR-coated glass substrate is then exposed to UV light to fully develop the PR. E-beam evaporation is then performed to coat with an electroconductive metal such as titanium or gold (3/50 nm). Lift-off of the PR is then performed to generate the IDE chip. FIG. 2C shows an illustration of an IDE, an equivalent circuit, and equations for how the IDE measures impedance variations from the applied sinusoidal voltage and measured alternating current. Sinusoidal excitation signal ($V_{PP}$=200 mV) is applied to each pair of IDEs, and the circuit board reads the resulting current and calculates the Discrete Fourier Transform (DFT). Since DFT measures the frequency-dependent energy of signals, the magnitude and phase of impedance Z at the frequency can be obtained by the following equations:

$$Z = \frac{v_i}{i_0} = \left|\frac{V_i}{I_o}\right| < \varphi_i - \varphi_o = \left|\frac{V_i R_{fb} R_A}{V_o}\right| < -\varphi_o,$$

where $v_i$, $i_o$, $V_i$, $I_o$, $\varphi_i$, $\varphi_o$, $R_{fb}$, $R_A$, $V_o$ are sinusoidal input voltage, output current, input voltage magnitude, output current magnitude, phase of the input signal, phase of the output signal, feedback resistance, internal amplifier gain, output voltage magnitude, respectively. The AD5933 stores the real (R) and imaginary (I) values of DFT at two 16-bit registers. The two data registers are accessed by the DAQ board using I2C protocol and saved in the customized LabVIEW software after data processing. The gain factor and system phase offset were first calibrated by measuring a resistor of known impedance with an LCR-Meter (VSP/VMP3, Bio-Logic Science Instruments) and swiping the frequency in the preferred range of 11 kHz to 91 kHz (FIG. 3).

Example 2

Equivalent Circuit of Microparticle-Amplified Impedance Sensor

Figure 4:
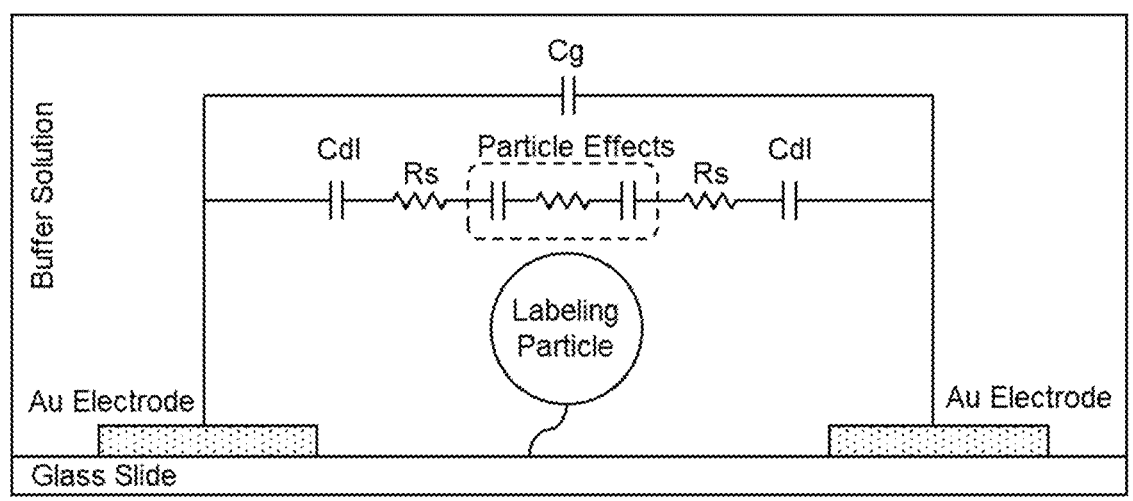
FIG. 4 shows an equivalent circuit of the impedance biosensor for a microparticle-labeled immunoassay. The analogous circuit consists of capacitance effects of electrodes, double layer capacitance of the electrode and microparticle surface, and the resistance of the solution.

Since the IDE biosensor is considered a non-faradic with microparticle amplification, to gain a better understanding of its working principle, an equivalent circuit model of a two-electrode system can be investigated. The sketch of this equivalent circuit is shown in FIG. 4. $C_g$ is the geometrical capacitance of the electrodes determined by the dimensions of the electrodes (thickness, gap, etc.) and the dielectric of the surrounding solution. $C_{dl}$ denotes the double-layer capacitances of the two electrodes and appears at the interface between a conductive electrode and an adjacent buffer solution. The resistance of the solution between two electrodes is given by:

$$R_{sol} = \frac{1}{nl} \cdot \frac{1}{\kappa} \cdot \frac{2K\left(\sin\frac{\pi w_{sp}}{2L}\right)}{K\left(\cos\frac{\pi w_{sp}}{2L}\right)}$$

$$C_{eq} = nl\varepsilon \frac{K\left(\cos\frac{\pi \omega_{sp}}{2L}\right)}{2K\left(\sin\frac{\pi \omega_{sp}}{2L}\right)}.$$

In the above equations, n, I, κ, $w_{sp}$, and L are the number of electrodes, length of fringes, solution conductivity, the spacing between two electrodes, and center-to-center distance of two adjacent electrodes, respectively. K(m) is the complete elliptic integral of the first kind of modulus and defined as:

$K(m)=\int_0^1 [(1-t^2).(1-mt^2)]^{-1/2} dt.$

Figure 5:
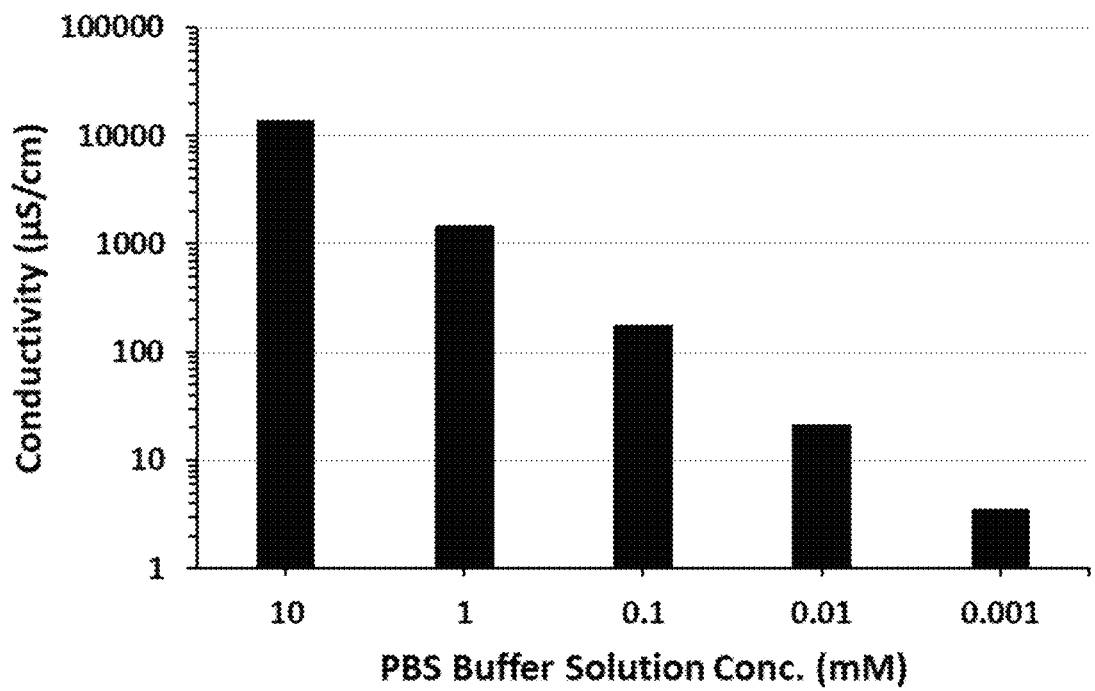
FIG. 5 shows a plot of buffer conductivity for different concentrations of the buffer using the circuit shown in FIG. 4, as measured by a conductometer.

Buffer conductivity (κ) is measured by a handheld conductivity meter (Oakton CON 6+, Cole-Parmer, USA), as is plotted in FIG. 5 for different concentrations of PBS buffer.

Figure 6:
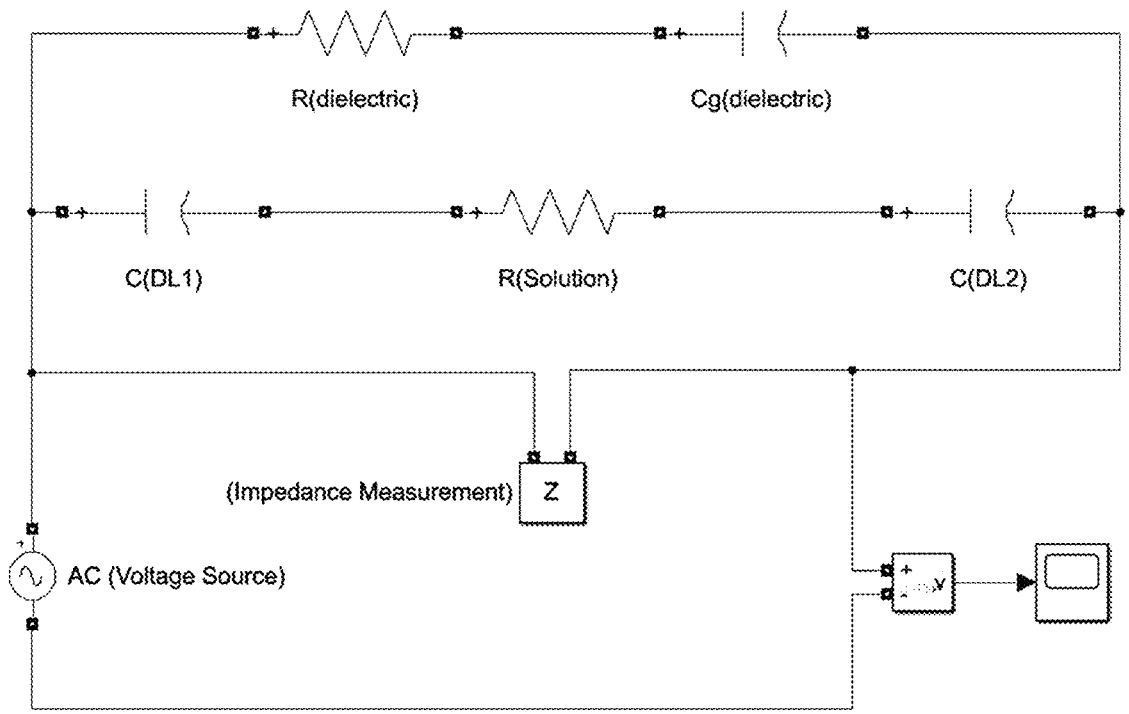
FIG. 6 shows a simulated equivalent circuit using Simulink, MATLAB.
Figure 7A:
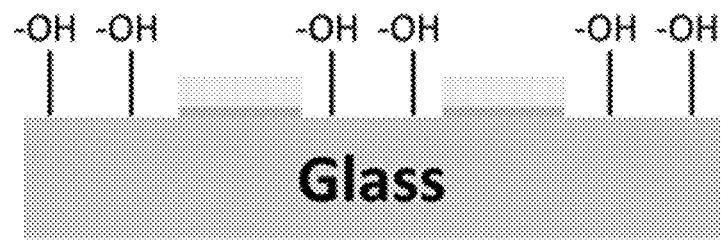
FIG. 7A-F show the surface functionalization process for a human tumor necrosis factor-alpha (TNF-α) immunoassay using improved detection with detector antibody-conjugated microparticles.
Figure 7B:
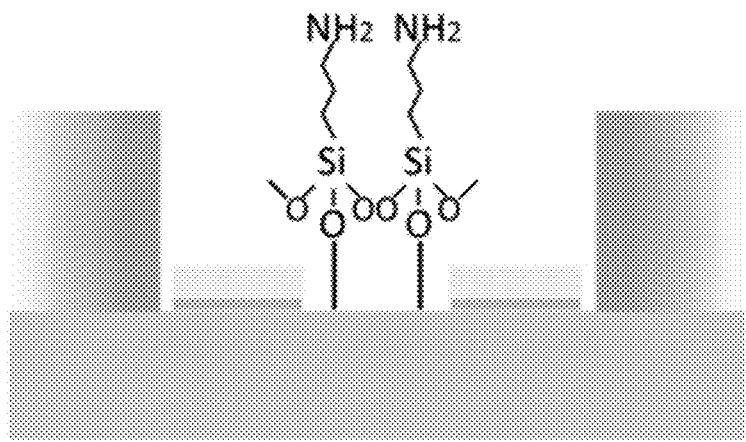
Figure 7C:
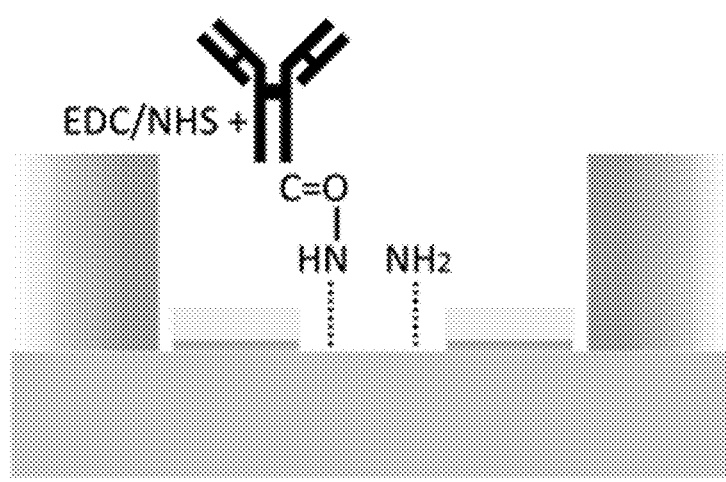
Figure 7D:
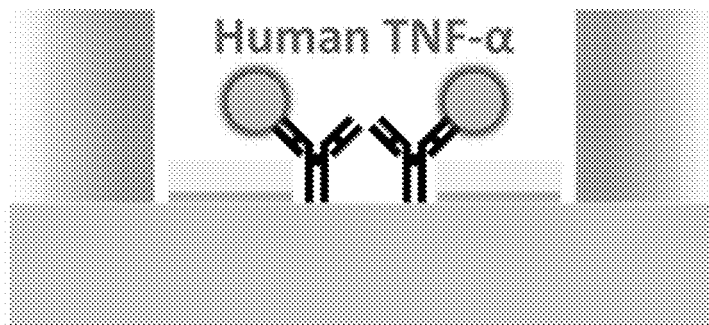
Figure 7E:
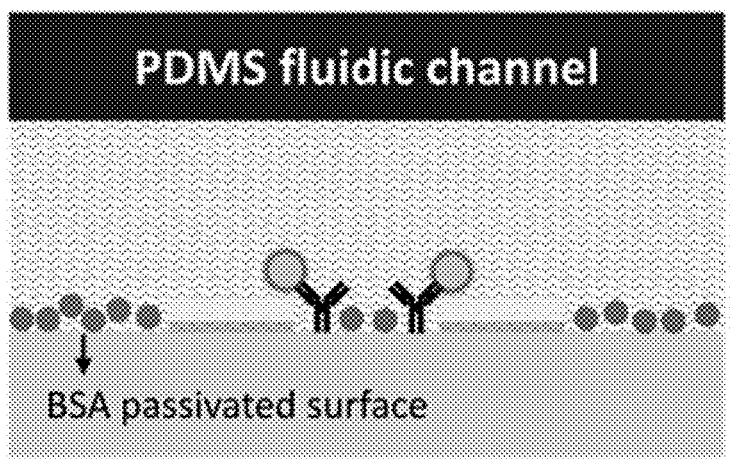
Figure 7F:
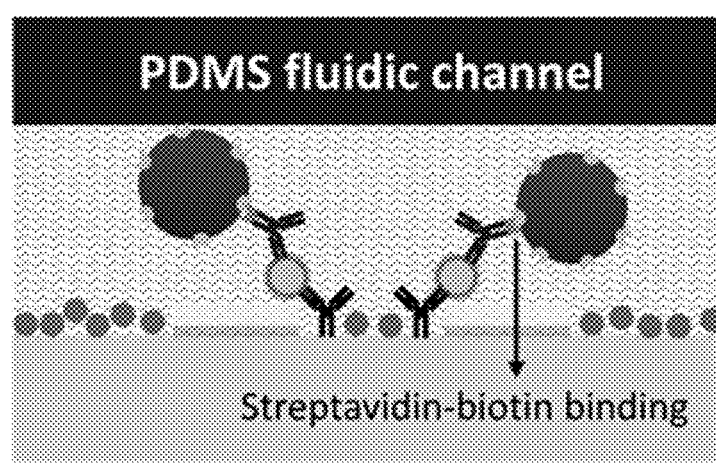

At this boundary, two ionic layers with opposing polarities on the electrode surface and buffer are formed when a voltage is applied. The two layers of ions are separated by a single layer of solvent molecules, adhering to the surface of the electrode and acts as a dielectric in a conventional capacitor. $R_s$ is the resistance of the buffer solution between the two electrodes that changes based on the buffer solution and is not affected by the interfacial affinity. $R_s$ is dependent on the space filled by the buffer and therefore depends on the length of the electrodes and the size of the gap between them. To validate each of these components, the simplified Randles equivalent circuit was simulated using Simulink, MATLAB (FIG. 6). As shown in FIG. 6, the two double layer capacitance of C(DL1) and C(DL2) are considered similar due to the symmetry of the electrodes and fixed to 30 nF. The values for R (dielectric) and Cg (dielectric) are estimated to be 20 kΩ and 0.6 nF, respectively. The impedance magnitudes for these solutions are also measured with the custom-made impedance analyzer and the same trend is observed. It should be noticed that the value from the impedance analyzer is the reciprocal of the absolute value measure by the LCR meter. From these measurements, the custom-made impedance analyzer is calibrated by equation $(G(f)=1/(Z_{LCR}(f) \times Z_{Analyzer}(f)))$ and plotted for the desired range of frequency.

Considering the immobilization procedure for capture antibody, the antibodies are most likely to be immobilized between the electrodes since oxygen plasma treatment generates hydroxyl groups on the glass surface. Therefore, by conducting microparticle-amplified IDE immunoassays, the microparticles are located mostly in between the electrodes. In this case, the microparticles affect the impedance between electrodes, introducing their resistivity, and double-layer capacitances to the gaps. The portion highlighted in FIG. 4 as the "particle effects" is the equivalent component induced by a single microparticle. For high target concentrations, multiple microparticles will locate between the electrodes, and the corresponding equivalent component will be repeated in series resulting in changes for impedance measurements.

Example 3

Microfluidic Integration

For a simple microfluidic integration, a PDMS-based microfluidic channel was fabricated by soft lithography. The height and width of the channel were 110 μm and 2.5 mm, respectively, which is enough to cover the entire area of the IDEs. Sample solutions were applied using a pipette into an inlet of the microfluidic channel, and a mini-vacuum pump (12/02EB, Thomas Pump) was placed in the outlet to drive all solutions for immunoassays as well as to perform hydrodynamic washing to remove unbound or non-specific microparticles.

Example 4

Characterization of Microparticles

To evaluate the amplification effect of various material microparticles on impedance signals, magnetic (Dynabeads M-280, Thermofisher Scientific, USA), polystyrene (08-19-303, Micromod, Germany), and silica (43-19-303, Micromod, Germany) microparticles coated with streptavidin were selected. Initially, to estimate the effect of material on the impedance signal, these three different microparticles having a diameter size of 2.8 μm were investigated using impedance spectroscopy at 5% IDE surface coverage. To control the percentage of surface coverage by microparticles, the microparticle suspension was diluted and the surface coverage was measured under the microscope after they sedimented on the surface (about 30 sec). Then, these microparticles were boiled at 120° C. for 120 minutes to denature all proteins on the surface to decouple the effect of surface charges from the material variations. From these measurements, an optimal microparticle was determined for a series of immunoassays. In addition, the resolution of the IDE sensing platform was verified by measuring impedance with respect to the surface coverage of magnetic microparticles. After preparing various microparticle coverages (0.01~10%) on the IDE array, the impedance magnitude changes were measured to estimate the overall LOD of this platform.

Example 5

Surface Functionalization and On-Chip Human TNF-α Immunoassay

For demonstrating an immunoassay using an impedance sensor, the IDE surface was functionalized with a capture antibody (Anti-TNF-α, Abcam, UK) as a receptor to detect TNF-α target analyte. In this study, carbodiimide-induced cross-linking was utilized to immobilize the capture antibody on the glass surface spacings between Au electrodes. FIG. 7A-F depict the whole process of surface functionalization and immunoconjugation. The IDE chip was first cleaned by treating with freshly prepared piranha solution ($H_2SO_4/H_2O_2$ 3:1 V/V) for 30 seconds, followed by extensive rinsing with deionized (DI) water and dried with nitrogen. The patterned PDMS film (HT 6240 Rogers Corp., USA) with opening windows on the IDE arrays was then placed on the cleaned IDE chip to apply biochemistry reaction only on a sensing area. After treating with oxygen plasma, the hydroxylated sensor surface was functionalized with 3% (3-Aminopropyl) triethoxysilane (APTES) to obtain an amine-functionalized surface. To adapt the carbodiimide coupling method, capture antibodies were activated by 1-Ethyl-3-(3-dimethylaminopropyl) carbodiimide (EDC) and Sulfo N-hydroxysuccinimide (Sulfo-NHS) (Thermo Scientific, USA), and then coupled with APTES-modified surface. After incubating the capture antibodies with the cross-linking reagents for 40 minutes, the IDE chip was rinsed with DI water. Then, seven different concentrations (10 µg/mL~100 µg/mL with a 10-fold dilution) of human TNF-α (ab9642, Abcam, USA) target analyte was further incubated on the patterned regions for 30 minutes. The PDMS microfluidic device was then attached to the glass slide via oxygen plasma treatment. Diluted Phosphate Buffer Saline (PBS) with 1% w/v bovine serum albumin (BSA) (1% PBSB) solution was first injected through a microchannel and incubated for 30 minutes for surface passivation. Then, biotinylated anti-human TNF-α antibodies (R&D Systems, USA) are conjugated with streptavidin-coated microparticles, and the microparticles were introduced into the microchannel using an external mini-pump. Impedance signal was measured in every single step of forming immunocomplex layers, and before each measurement, washing was carefully conducted with the proper buffer solution to thoroughly remove unbound molecules and ion residues. To eliminate the effects of variation in the baseline values, the impedance response was normalized during the measurements ($\Delta Z$) with the initial impedance to each pair of IDEs ($Z_0$), and this is referred to as the normalized impedance variation ($\Delta Z/Z_0$).

Example 6

Influence of Buffer Concentration on Impedance Sensor Performance

Figure 8:
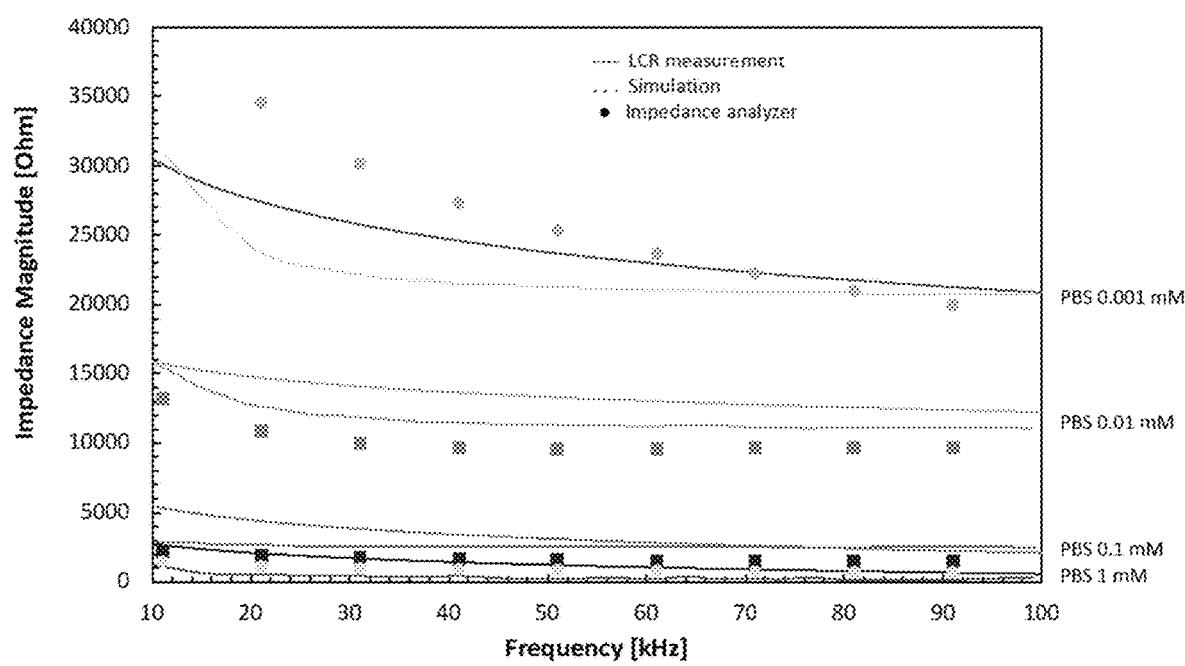
FIG. 8 shows different concentrations of PBS in deionized water that was measured on the IDEs using a commercial LCR meter and impedance analyzer and calculated from a simulation model. Buffer concentrations of 0.1 mM and above show saturations and make it impossible to get impedance variations by immobilization of biomolecules. For PBS 0.01 mM, less saturation effects were observed, and considering the pH buffer capacity, PBS 0.01 mM was selected as a buffer solution during impedance signal measurement.

An appropriate buffer should be selected for an optimal microparticle-labeled impedance sensing since impedance sensors are highly sensitive to the specific buffer solutions. First, the impedance values were measured from the impedance analyzer, the simulated Randles model, and validated with the LCR meter for various PBS concentrations. FIG. 8 shows all measurements and simulation results over the examined frequencies of 11 kHz to 91 kHz for PBS concentrations of 1 mM~0.001 mM, demonstrating similar trends and consistent results for all obtained values. From detailed comparison studies with the simulation result for 0.001 mM PBS at 11 kHz, 11% and 13.5% differences were observed from the LCR meter and the portable impedance analyzer, respectively. These differences under the low buffer concentration can be originated from manufacturing variations of the IDE electrodes since the impedance signals are more sensitive to the electrodes at lower frequency. For this work, normalized impedance variations were primarily used for immunoreaction, so the differences can have minimal impact on the measurements. As shown in FIG. 8, PBS buffers with concentrations of 0.1 mM and above show similar impedance magnitude at the range of <5 kΩ, where the signal is dominated by the buffer solution. By further dilution of PBS to 0.01 mM, the impedance magnitudes increase into the range of >10 kΩ. Since impedance variations from immunoreactions cannot be differentiated under highly conductive and saturated buffer solutions, 0.01 mM PBS or lower PBS concentrations are suitable for impedance-based immunoassays. However, if PBS concentration is too low, the buffering capacity is dwindled. By considering the background signal and buffering capacity, 0.01 mM PBS was selected as a sample buffer solution for all subsequent experiments. Shown below in Table 1 is the calculated solution resistance on the IDE using the following equation:

$$R_{sol} = \frac{1}{nl} \cdot \frac{1}{\kappa} \cdot \frac{2K\left(\sin\frac{\pi w_{sp}}{2L}\right)}{K\left(\cos\frac{\pi w_{sp}}{2L}\right)}$$

TABLE 1

Calculated solution resistance on the IDE.

| | PBS 10 mM | PBS 1 mM | PBS 0.1 mM | PBS 0.01 mM | PBS 0.001 mM |
|---|---|---|---|---|---|
| R(Solution)/Ohm | 3.88e1 | 3.69e2 | 2.99e3 | 2.5e4 | 1.53e5 |

Example 7

Microparticle Material Composition on Impedance Sensor Performance

Figure 9:
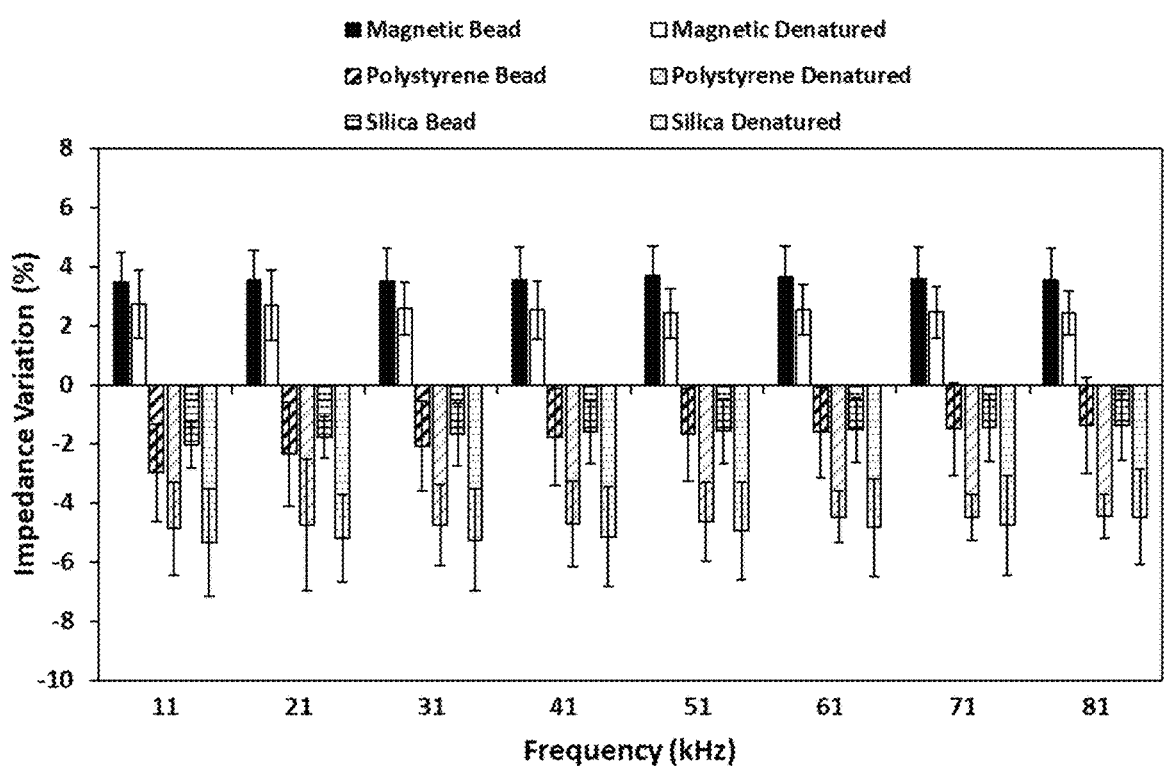
FIG. 9 shows three different microparticle types including magnetic, polystyrene, and silica beads that were selected and characterized. All microparticles were at the same size of 2.8 μm and had the same surface coating of streptavidin for original microparticles. For heat denaturing of microparticles, boiling of the particles was performed on a hot plate and these denatured microparticles were then used for impedance measurements. All data are collected for 5% IDE surface coverage. The left-to-right sample ordering at each tested frequency is Magnetic Bead, Magnetic Denatured, Polystyrene Bead, Polystyrene Denatured, Silica Bead, Silica Denatured.

Since the material and surface characteristics of microparticles have a significant impact on the impedance signals, the effect of various microparticles on impedance measurements was investigated. Generally, microparticles affect the capacitance by forming dielectric layers as well as the resistance by blocking the electric field fringe, as can be predicted from the equivalent circuit (FIG. 4). FIG. 9 shows normalized impedance variation induced by various microparticles over the frequency range of 11 kHz to 91 kHz, representing both values of resistance and capacitance $$\left(Z = Z_R + Z_c = R + \frac{1}{j\omega C}\right).$$

The impedance values were normalized with respect to the baseline signal from the buffer solution for each IDE. To decouple the effects of materials and surface of the microparticles, streptavidin-coated microparticles and denatured microparticles were prepared for these characterization experiments. For polystyrene and silica microparticles with streptavidin, the impedance variation percentage changes with respect to the frequency from 1.10% to 3.04% and 1.11% to 2.02%, respectively. After denaturing these microparticles, the impedance variations increase to 3.98~4.53% for polystyrene and 4.08~4.85% for silica. However, for the magnetic particles, it was observed that the impedance variations decrease to 2.16~3.36% for denatured microparticles. These results can be explained by the interfacial interaction in the presence of streptavidin on the microparticles and promoting microparticle surface charge. For silica and polystyrene microparticles, the surface charges bridge the electric field and contribute to lower impedance variation compared with the denatured condition. Whereas the absence of surface charges in electrically permeable superparamagnetic microparticles increases permittivity and the overall impedance variations slightly drop. It is also observed that normalized impedance variations for electrically impermeable materials decreases by ascending of the measuring frequency, revealing that for both streptavidin-coated and denatured conditions, capacitance effects are more dominant rather than resistance. However, the impedance variations for magnetic microparticles are less dependent on the applied frequency, demonstrating that the resistance formed by magnetic microparticles is more dominant than the double-layer capacitance imposed by non-conductive particles (FIG. 4). For the magnetic microparticles, polarization effects also contribute to the overall impedance magnitude. When magnetic microparticles locate in between the IDEs, the external electric field polarizes magnetic microparticles and, therefore, alters the evenly distributed electric field in the vicinity of the microparticles resulting in higher resistance. Additionally, by calculating the relative standard deviation (RSD %), the normalized impedance variation demonstrated better precision for magnetic microparticles (11%) compared to the polystyrene (21%) and silica (19%) in the studied frequency range of 11 kHz to 91 kHz. Based on the above-mentioned considerations, magnetic microparticles were selected for the consequent measurements due to their higher output signal and better precision.

Example 8

Influence of Surface Functionalization of Impedance Variations

Figure 10:
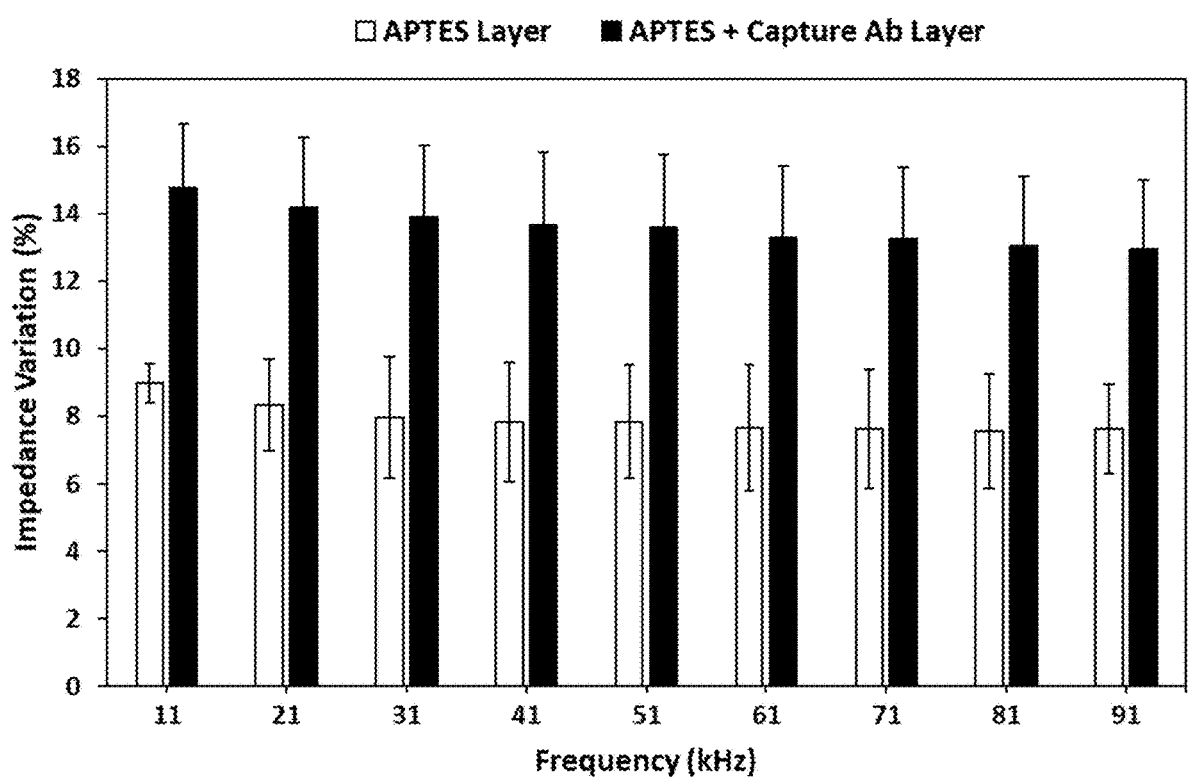
FIG. 10 shows the normalized impedance variation percentage during surface functionalization. Percent variation of the impedance signals increases with each of APTES and capture antibodies on IDE sensors. These variations slightly decrease with increase of the frequency from 11-91 kHz due to the effects of the generated double-layer capacitance.

The normalized impedance variations after surface functionalization are depicted in FIG. 10. APTES is the first layer on top of the bare electrodes, and an immobilized capture antibody is the second layer. Although the single-layer thickness of APTES is assumed to be less than 10 nm, its coverage as the first capacitance layer results in significant impedance increments. This demonstrates the importance of the first layer, suggesting minimizing its capacitance as much as possible to improve the sensitivity during immunoassay. After adding the capture antibody, the normalized impedance variation increased due to the antibody layer. From these thickness variations, 11 kHz shows the most responsive frequency by electrical-double layer capacitance compared with other frequencies, so a frequency of 11 kHz was selected for further measurements.

Example 9

Hydrodynamic Washing for Effective Immunoassays

To ensure that a microparticle-labeled immunoassay is highly sensitive, the surface of the substrate should be washed with a hydrodynamic force sufficient to remove any unspecific and unbound microparticles. After introducing the detection antibodies conjugated with microparticles, the washing step was conducted in the microfluidic channel. The buffer volumetric flow rate was kept constant at 20 µL/min by applying a negative pressure in the microchannel outlet using the small mini pump. This volumetric flow rate corresponds to an average velocity of 1.3 mm/s in the channel generating a total force of 40 pN on the microparticles. The total forces are less than the adhesion strength in the immunocomplex; however, they are sufficient to dislodge non-specific bindings from the surface.

Example 10

On-Chip Human TNF-α Immunoassay

Human TNF-α immunoassay was conducted on the impedance-based biosensor. TNF-α has important pro-inflammatory properties, which play crucial roles in the innate and adaptive immunity, cell proliferation, and apoptotic processes. Increased concentrations of TNF-α are found in acute and chronic inflammatory conditions (e.g., trauma, sepsis, infection, arthritis). The human TNF-α contains 157 amino acids with a molecule weight of 17.4 kDa and an isoelectric point (pl) of 5.8.

Figure 11A:
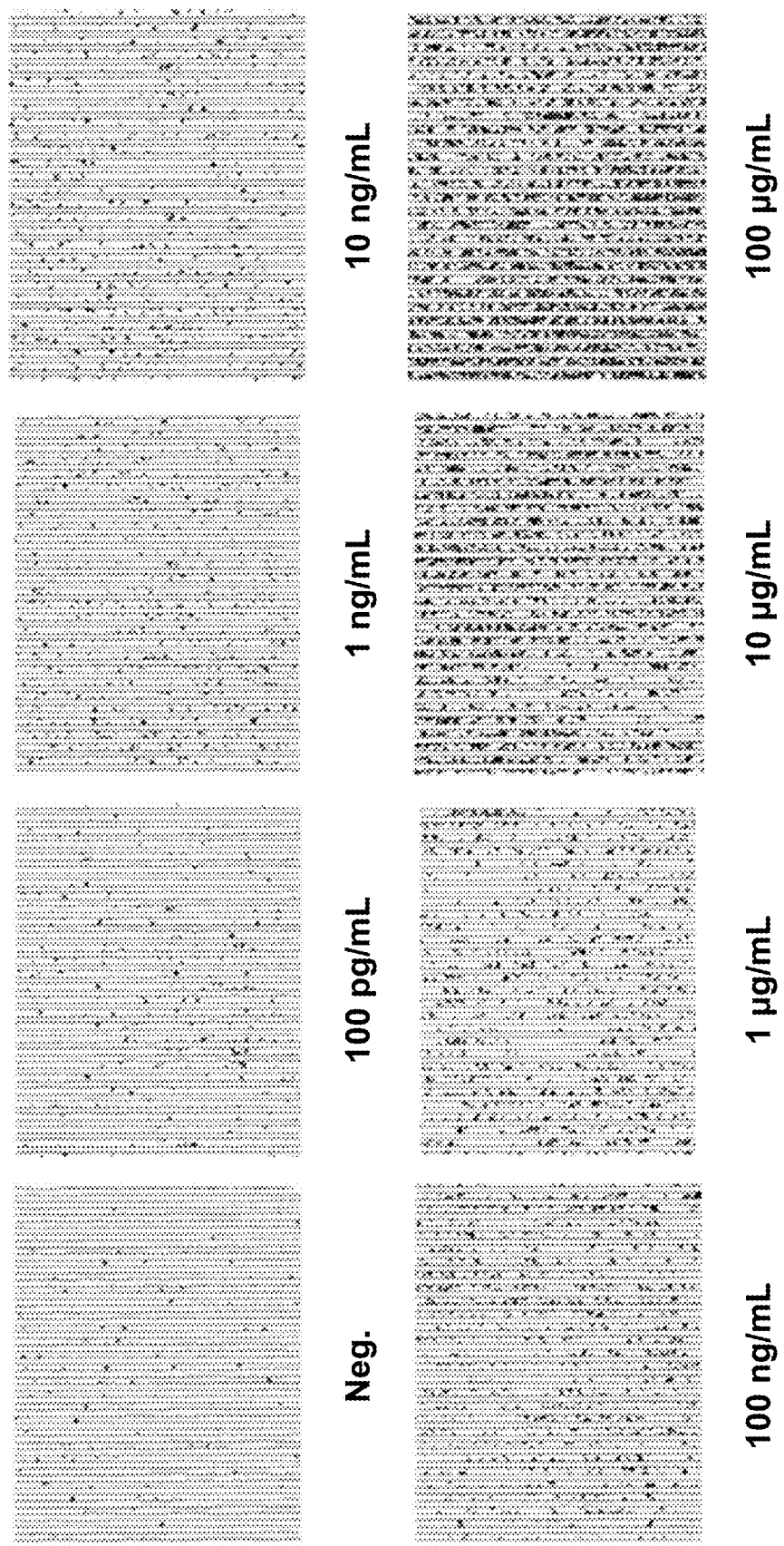
FIG. 11A-C show impedance variation and IDE surface coverage for various target analyte concentrations with and without magnetic microparticle-conjugated detector antibodies.
Figure 11B:
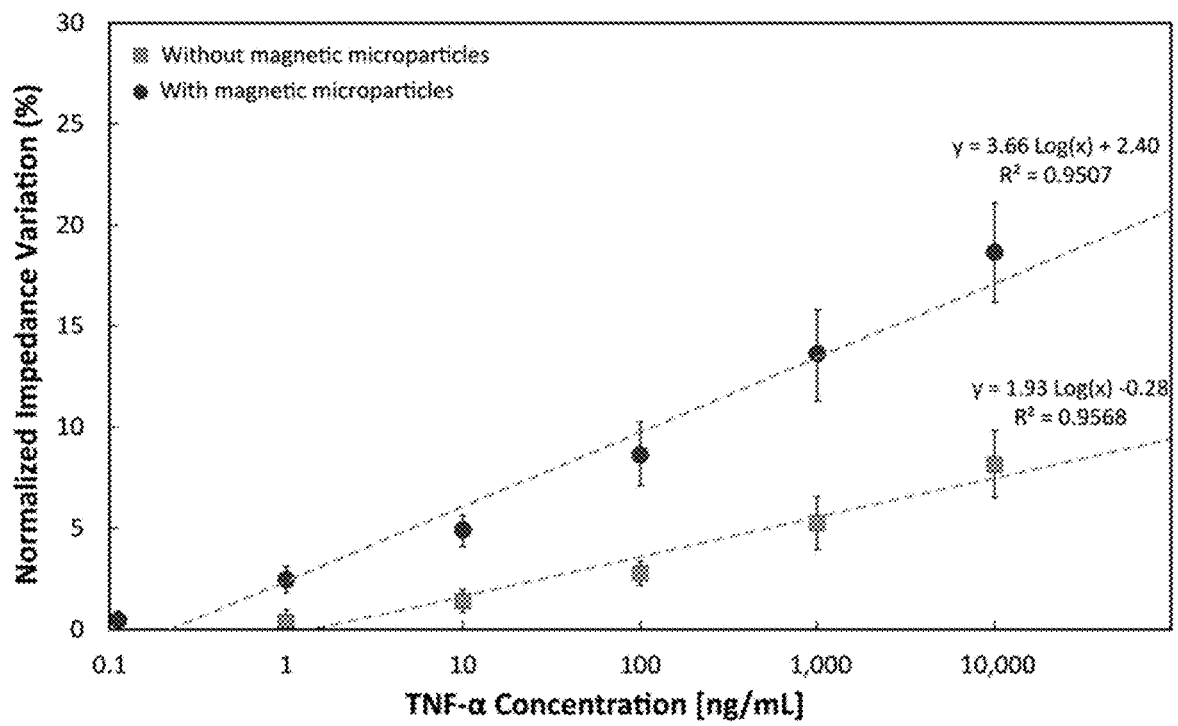
Figure 11C:
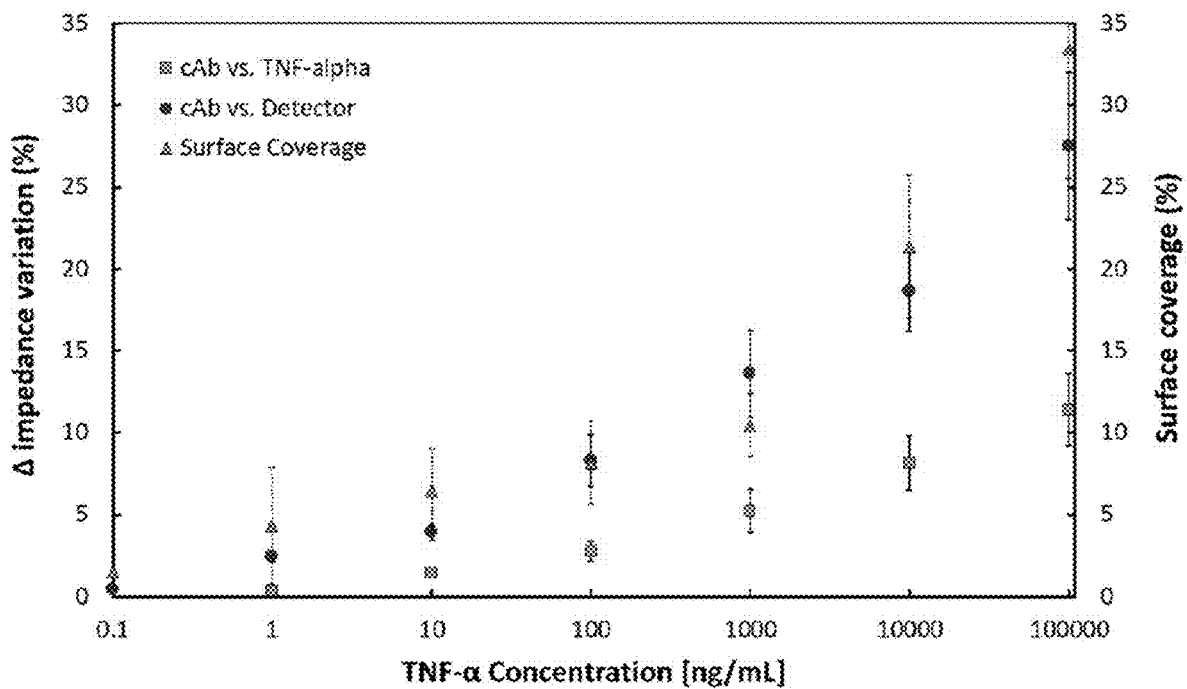
Figure 12:
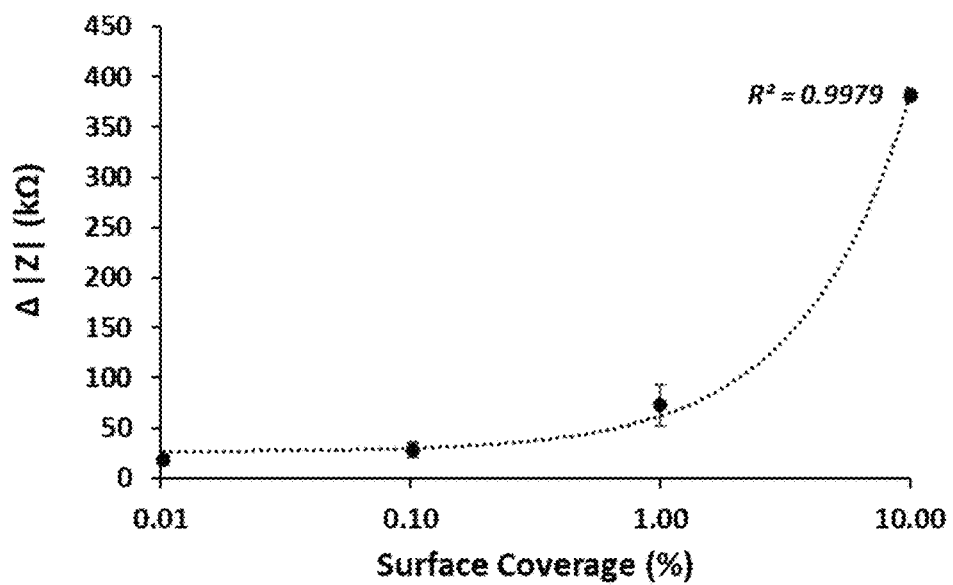
FIG. 12 shows impedance differential magnitude for 2.8 μm magnetic microparticles with respect to different surface coverage on the IDEs at 11 kHz.

To conduct the immunoassay, seven different concentrations (10 µg/mL to 100 µg/mL) of human TNF-α was first incubated on capture antibody-modified IDEs for label-free detection. After measuring the impedance signals, anti-TNF-α antibody-conjugated magnetic microparticles were added to conduct a sandwich immunoassay to investigate signal enhancement. FIG. 11A shows the distribution of the microparticles associated with the different concentrations of TNF-α. From surface coverage images shown in FIG. 11A, it could be observed that microparticle coverages are proportional to the concentration of target analyte biomolecules. By obtaining a series of impedance variations adjusted by a background signal, it was found that these differential magnitudes increase due to the increasing number of microparticles and surface coverage, as shown in FIG. 12. From LOD calculation at 11 kHz, this sensor can detect as low as 0.1% change of surface coverage of magnetic microparticles. Further measurements have been performed with the impedance analyzer. FIG. 11B-C shows the standard curves, representing the relation between the relative impedance signal and the analyte concentration for the label-free and microparticle-labeled immunoassays. From statistical analyses, the LOD of 0.9 ng/mL and 83.46 pg/mL have been achieved for label-free and microparticle-labeled immunoassays, respectively. The microparticles enable one order of magnitude improvement in LOD. In the case of the label-free assay, TNF-α molecules bind to the capture antibody and contribute an additional capacitance layer by forming a thin TNF-α molecular layer. Since the pl of TNF-α is 5.8, it has partially negative charges in the PBS buffer with a pH of 7.4. As the concentration of TNF-α antigen is increased, more negative charges are accumulated in between the electrodes, resulting in higher electric field dispersion and impedance variation. When labeling with magnetic microparticles, higher impedance variation is observed compared to the label-free assay due to the blockage of the electric field and material properties of the microparticles. For higher concentrations of the target, magnetic microparticles become closer to each other and may locate on the electrodes even though they are expected to be immobilized in between the electrodes on the functionalized area of glass. In this case, the polarized microparticles between the IDEs under the electric field generate an additional magnetic field, especially when the distance is smaller than the Debye lengths. This results in a high impedance variation signal for higher concentrations of the target (>100 ng/mL). However, it also increases the standard deviation due to the variation of microparticle distances from each other as well as random polarization. Additionally, to quantify the precision of the assays, coefficient of variations (CV) were investigated. In this work, a CV below 20% from both label-free and microparticle labeled assays was achieved, which is an appropriate CV over the dynamic range of the target biomolecule concentration.

Table 2, shown below, highlights non-faradic IDE-based immunosensors for various targets and interfaces based on previous studies. Generally, label-free detection shows less sensitivity compared to those employing signal enhancement techniques. Although the sensitivity of some label-free immunosensors have been improved by optimizing the detection protocol and finger geometry of IDEs, signal enhancement techniques show more promising and cost-effective results for improvement of the overall LOD. Given more than one order of magnitude in overall LOD with microparticle labeling method and controlled hydrodynamic washing force through a microfluidic channel in this study, the impedance signal can be further enhanced if the signal enhancement technique is supplemented with optimized IDE spacing characteristics.

impedance signal. However, by considering the ratio of the electrode gap to micro/nanoparticle sizes, optimal biosensing performance can be determined. Furthermore, by incorporating a blood serum separation membrane on the microfluidic chip, and including a communicating chip to interact with a smartphone or a laptop, this device would be an ideal standalone POC platform with high sensitivity and the ability for multiplex diagnostics.

TABLE 2

Comparison between analytical parameters from IDE-base immunosensors.

| Target Biomolecule | LOD [ng/mL] | Electrode spacing | Microfluidic component | Functionalization/ Preparation | Assay Time [min] | Remarks |
|---|---|---|---|---|---|---|
| Human Serum Albumin [1] | 200 | 4-20 μm | No | >135 h | 60 | Label-free |
| Cardiac troponin I [2] | 0.2 | — | No | >12 h | 120 | Label-free; Surface area enhanced by GNP |
| Plasmodium lactate dehydrogenase [3] | 0.25 | 8 μm | No | >12 h | 120 | Label-free |
| Carcinoembryonic antigen (CEA) [4] | 1 | 20 μm | No | >44 h | 30 | Impedance signal enhanced by GNP; Single electrode utilized |
| TNF-α | 0.083 | 10 μm | Yes | <2 h | 30 | Magnetic microparticle for signal enhancement |

[1] Chuang et al., *Biosens Bioelectron*, 2011, 28, 368-372.
[2] Bhalla et al., *Sensors and Actuators B: Chemical*, 2012, 161, 761-768.
[3] Low et al., *Sensors (Basel)*, 2019, 19.
[4] Yeh et al., *Sensor Actuat a-Phys*, 2016, 241, 203-211

By developing various biosensors for detecting biomolecules, enhancing the sensitivity of these platforms has drawn lots of attention. These studies demonstrate an impedimetric biosensor consisting of a small impedance analyzer, a data acquisition board, and an IDE array integrated with a microfluidic channel that was successfully developed. The impedance signal from this platform was first verified by simulation in MATLAB Simulink and an LCR meter. The resolution of the platform to detect a single layer of biomolecule and microparticle detection was examined, and a real assay was conducted to quantify the human TNF-α. After testing three different types of the microparticle, the detector antibodies were labeled with that of generating the highest and consistent impedance signal. The LOD could be improved by order of magnitude compared to the label-free bioassay using magnetic microparticles. This novel, sensitive impedance biosensor with a microparticle-labeling method for signal enhancement utilizes microfluidics for controlled hydrodynamic washing forces that has potential for POC application.

Among various digitized biosensors, impedimetric biosensors have shown promise for POC due to its ease of integration, miniaturization, fast response, cost-effective assay, and conveniently communication with smartphones. The platform described herein can be integrated with capillary-driven microfluidics for autonomous and sequential delivery of analytes. This microfluidics approach should be precisely designed to control the flow rates in a certain range to have a controlled hydrodynamic washing force for a microparticle-labeled immunoassay. To improve the functionality and LOD, further characterization and optimization can be conducted. As has been previously demonstrated, the size of micro- or nanoparticles does not greatly affect the Example 11

Capillary-Driven Microfluidics

An integrated capillary microfluidic and impedance-based biosensor is described that contains all necessary components to conduct a signal-amplified sandwich immunoassay using a microparticle labeling method. A controlled capillary-driven force is utilized for fluidic manipulation and magnetic microparticles are adapted to enhance the impedance signals for LOD improvement. To conduct the bioassay, a small volume of the sample (μL range) is introduced to the microfluidic chip that sequentially delivers all necessary samples and reagents into the sensing area. This integrated chip (or cartridge) is inserted into a hand-held impedimetric biosensor to read out the signals. For a real immunoassay, the reagents are sequentially delivered in about 6 minutes on this integrated platform with minimal user intervention using capillary action microfluidics. For demonstration, human troponin I can be tested to check overall functionality of this integrated platform. The integrated microfluidic and IDE platform enables a sample-in-answer-out immunoassay platform for rapid molecular diagnostics.

Capillary Microfluidic Design

Figure 13:
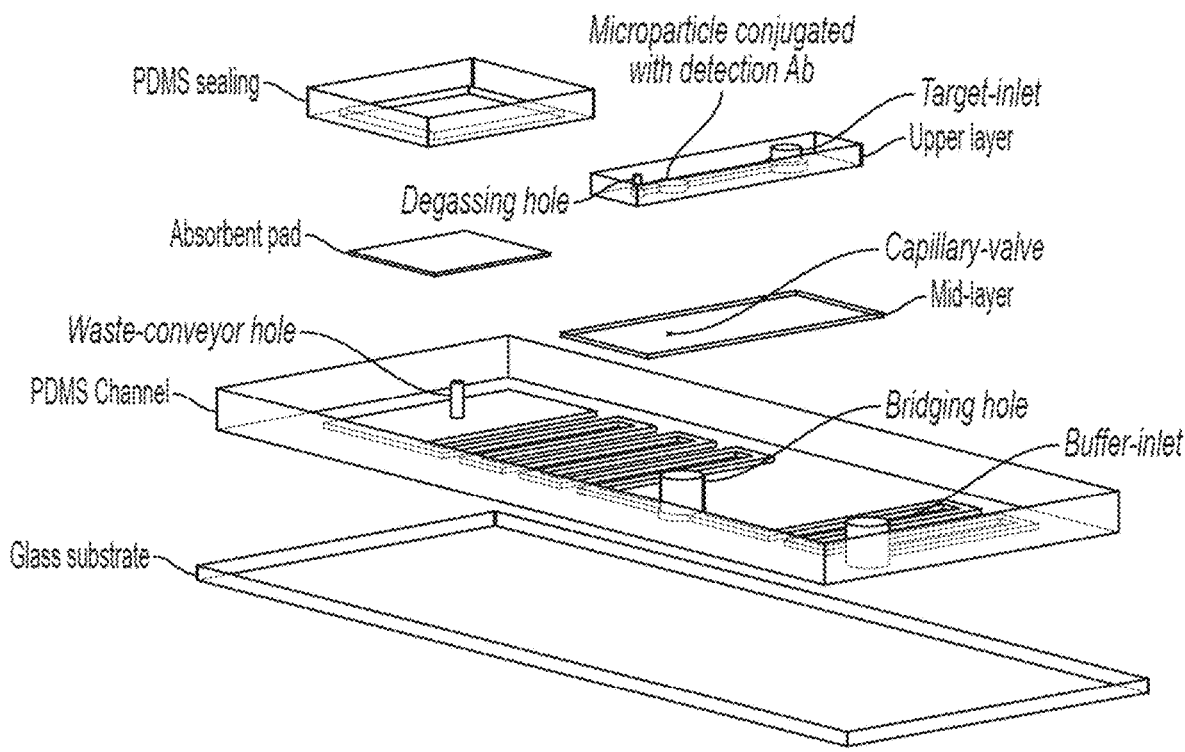
FIG. 13 shows a schematic view of an exemplary microfluidic chip comprising a two-stage microfluidic network having a capillary valve and bridging hole.

A two-stage capillary-driven microfluidic system was developed to conduct a precisely controlled sandwich immunoassay, as shown in FIG. 13. Both stages were designed in AutoCAD and the corresponding mask was obtained from CAD/Art Services. The width of the channel in buffer storage and wasting sections are adopted at 500 μm, while the width of the channel from branching to the sensing area is 200 μm. The desired pattern was developed on the silicon wafer as a master mold following a conventional photolithography process. The height of the channel for both stages is fixed at 100 μm. The PDMS was mixed with curing reagent at a 10:1 w/w ratio and cured overnight in a convection oven. After curing, the PDMS was peeled off of the master mold and punched with biopsy punches. The buffer inlet, bridging hole, and outlet were punched on the first stage with diameters of 2.5 mm, 1 mm, and 0.5 mm, respectively. A mid-layer was cut from a PDMS film (HT6240, Rogers Corporation, USA) and a 250 µm hole was created on the mid-layer, which acts as a capillary-stop valve (CSV) between two PDMS stages. The top layer that is designed to deliver the target analytes into the sensors has two holes for target-inlet and degassing (venting) with sizes of 1.5 mm and 0.5 mm, respectively.

Working Principle of Capillary-Driven Microfluidics

Figure 14:
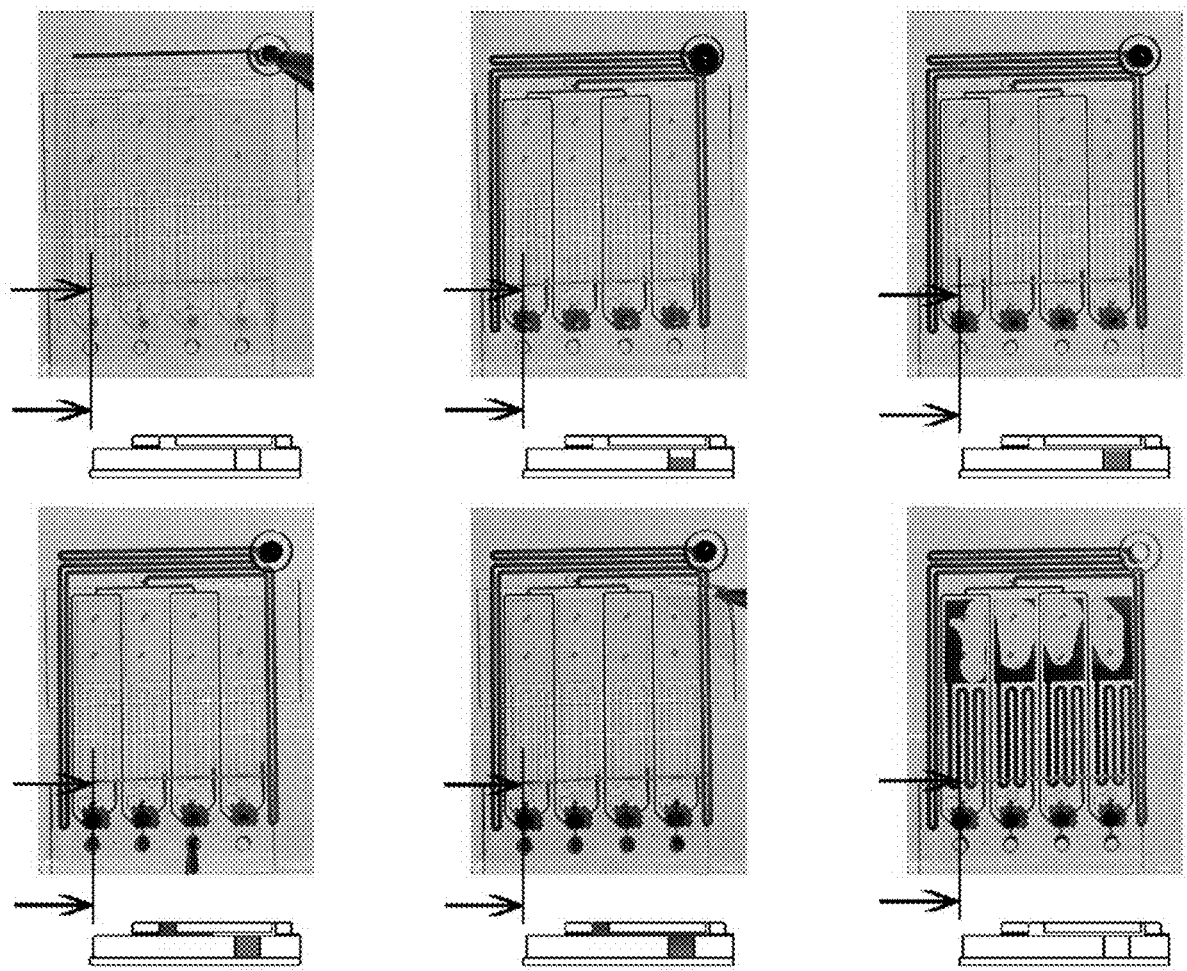
FIG. 14 shows a working principle flow of the capillary valve in a two-stage microfluidic channel network with a buffer solution and a sample solution comprising target analyte.

The buffer solution, 1% bovine serum albumin in PBS 10 mM (PBSB 1%), is first added to the buffer inlet while the outlet vent is covered (see FIG. 14). The capillarity drives the buffer toward the outlet passing from the sensing area. Since the channel is close-ended (in the case of covering the outlet-vent), a total volume of 0.2 µL proceeds the sensing area in each branch and stops 5 mm after the bridging hole. Once the buffer reaches the bridging hole, it starts rising up the hole until it is thwarted by the CSV in the middle of two stages. The device is then ready to be run by introducing samples comprising target analyte into the sample inlet hole on the upper microfluidic stage. The samples first hit detector antibody (dAb)-conjugated microparticles in the middle of the channel and form immunocomplexes that are ready to be captured by the capture antibody (cAb) on the sensing spots. By contacting this sample solution to the bridging hole, it mixes with the buffer from the lower stage and flows into the sensing area. At that time, by removing the cover from the outlet vent, all analytes start to flow toward the outlet by passing over the sensing area and generating the immunocomplexes on top of the IDEs.

Design and Fabrication of an Integrated IDE Sensing Platform

Figure 15A:
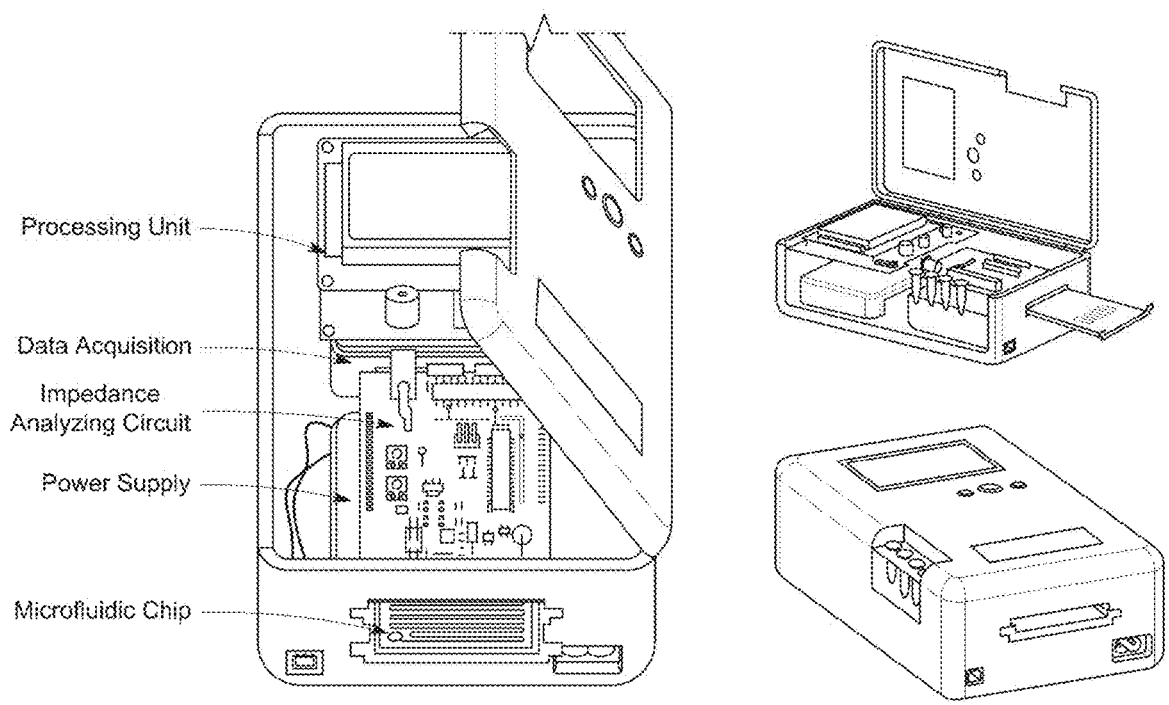
FIG. 15A shows an exemplary design of an integrated handheld POC device including a microfluidic chip, impedance analyzing circuit, power supply, data acquisition board, and processing unit.
Figure 15B:
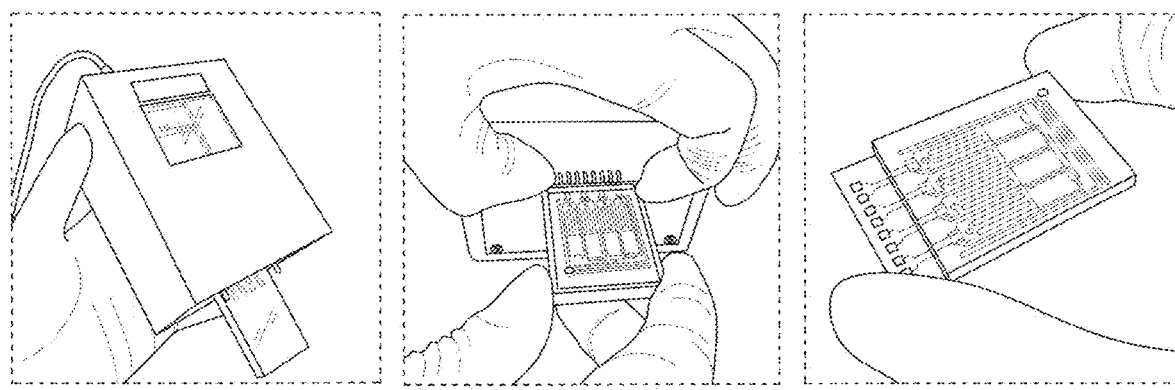
FIG. 15B shows another exemplary design of an integrated handheld POC device with an integrated IDE and microfluidic chip. With the design of FIG. 15B, all housing and circuit was fabricated with a 3D printer.

An integrated handheld device was designed that includes all necessary components to conduct a capillary-driven microparticle-labeled sandwich immunoassay with an impedimetric biosensor. The microfluidic chip on top of the IDE chip is placed on a slider that can be inserted into the box of the device (FIG. 15A-B). Electrical impedance in the analyzer circuit by a 12-bit impedance converter chip, AD 5933 (Analog Devices Inc.), was designed to be contacted with the electrode pads on the microchip cartridge with its spring pins. The device is connected to a laptop using a USB port from a DAQ board, as shown in FIG. 15A. With the alternative design shown in FIG. 15B, all housing and circuit was fabricated with a 3D printer.

Flow Control in Capillary Microfluidic Channels

Controlling the flow rate in a capillary-driven microfluidic system is a crucial parameter that should be carefully considered when designing the channels, since for a certain material the flow rate is solely dependent on the channel geometry. By simplifying the Navier-Stocks equation for laminar and steady state flow without any other body forces (e.g., gravitational force), the volumetric flow rate can be estimated by:

$$Q = \frac{h^3 w \Delta P}{12 \mu L(t)} \left[1 - 0.630 \frac{h}{w}\right],$$

where h, w, µ, and L(t) are the channel height, width, liquid viscosity, and the time dependent liquid length in the channel, respectively. This estimation has a 13% error for h=w and goes down to 0.2% for h=w/2. By substituting the Young-Laplace equation for ΔP, flow rate for a capillary-driven system can be calculated.

For a CSV, the pressure barrier is also dependent on geometrical parameters as well as the liquid contact angle according to the following equation:

$$\Delta P = \frac{2\gamma}{h} \left[ \frac{\cos\theta - \frac{\alpha \sin\beta}{\sin\alpha}}{\cos\beta + \frac{\sin\beta}{\sin\alpha}\left(\frac{\alpha}{\sin\alpha} - \cos\alpha\right)} \right],$$

where γ and h are the interfacial tension and channel height, respectively.

It has been reported that one hour after a 1-minute oxygen plasma treatment, water contact angle reaches to about 45°, and this was used as θ to calculate the burst pressure in the CSV. Assuming γ=20 mN/m and h=250 µm (the size of the capillary valve), burst pressure of each CSV would be 55 Pa, equal to 5.5 mmH$_2$O. The volume capacity of the fluidic channels for h=110 µm is 55 mm$^3$ (=µL), consisting of 13 mm$^3$ from inlet to the branching point and 10.5 mm$^3$ for each branch. Once the buffer reaches to the bridging hole, 35 µL is the total volume needed to complete the assay. Having the buffer inlet size of 3 mm and considering 2 mm for the PDMS layer thickness, the hydraulic head generated by this 35 µL buffer volume would be less than the burst pressure of the CSV. This guarantees the performance of the designed CSV for the fluidic network.

Figure 16:
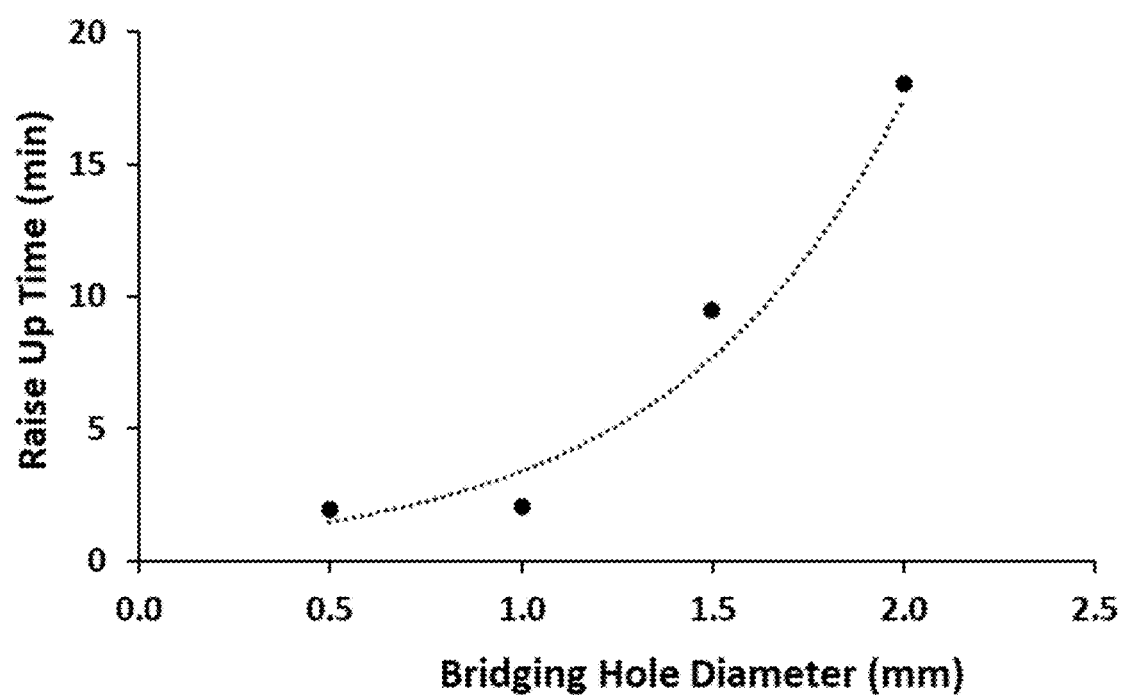
FIG. 16 shows the buffer raise up time in the bridging hole for different bridging hole diameters based on the microfluidic design depicted in FIG. 13.

To estimate the overall assay time, the filling times for the different sections were investigated. It takes about 3 minutes for buffer to completely fill the priming section and reach to the sensing area. The effect of bridging hole diameter on the raising time of the buffer in the bridging hole to the CSV was investigated, as plotted in FIG. 16. It was found that a bridging hole diameter below 1 mm does not change the raise-up time significantly, and therefore a 1 mm bridging hole diameter was selected. For this 1 mm hole size, it takes 2 minutes for the capillary-driven filling buffer. After introducing the target analytes (~1 minute), waiting for diffusion of the analytes (~1 minute), and removing the cover tape from the outlet, it takes about 1 minute to fill the waste-bin and finish the assay. Considering all timing, it takes about 6 minutes total to complete the full assay using this design.

Bioassay Demonstration with Human Troponin I Analyte

Figure 17:
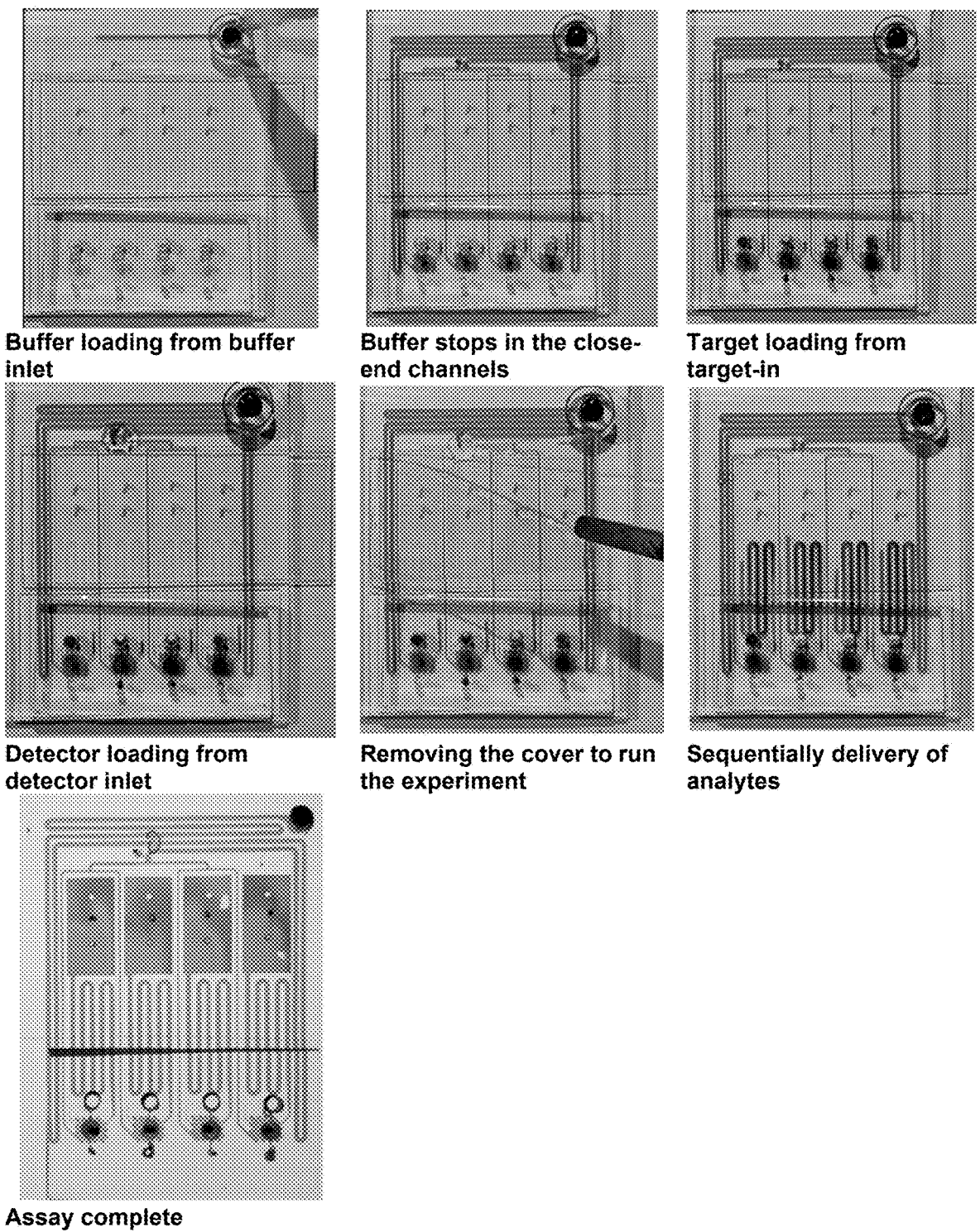
FIG. 17 shows an exemplary autonomous and sequential flow process in the integrated IDE system with a capillary-driven microfluidic chip, a buffer solution, a sample solution comprising target analyte, and detector antibody-conjugated microparticles.

As shown in FIG. 17, detailed fluidic sequences have been demonstrated. With the captured frames in FIG. 17, the assay initially begins with a buffer loading step from the buffer inlet. The buffer flows through the capillary channel until Young Laplace pressure reaches steady state. Then, sample liquid and detection antibody-conjugated microparticles were loaded in each well for sequential reaction. After removing cover tape on the outlets, a pressure builds up and forces all of the liquids to move through the capillary channels, and the antigen and antibody reactions occur during the flow.

Figure 18A:
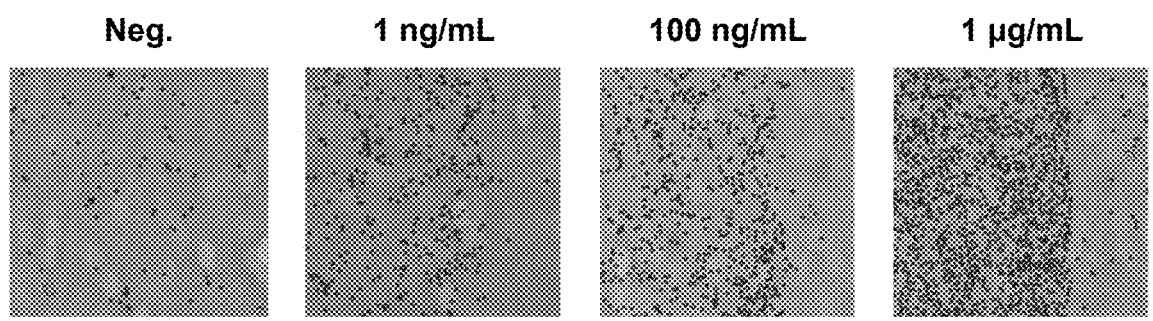
FIG. 18A-B show impedance variations at 11 kHz from a sandwich immunoassay on the integrated IDE sensing platform having a capillary-driven microfluidic network. Capture antibodies (cAb, mouse monoclonal anti-cardiac troponin I antibody) were immobilized on the IDE array and various human cardiac troponin I target analyte (cTnI) concentrations were tested with detector antibody-conjugated microparticles (cTnI vs. Detector) and without detector antibody-conjugated microparticles (cAb vs. cTnI). The detector antibodies were also mouse monoclonal anti-cardiac troponin I antibodies and were conjugated to 2.8 μm M-270 magnetic microparticles. The cTnI analyte was from human heart tissue and had been lyophilized.
Figure 18B:
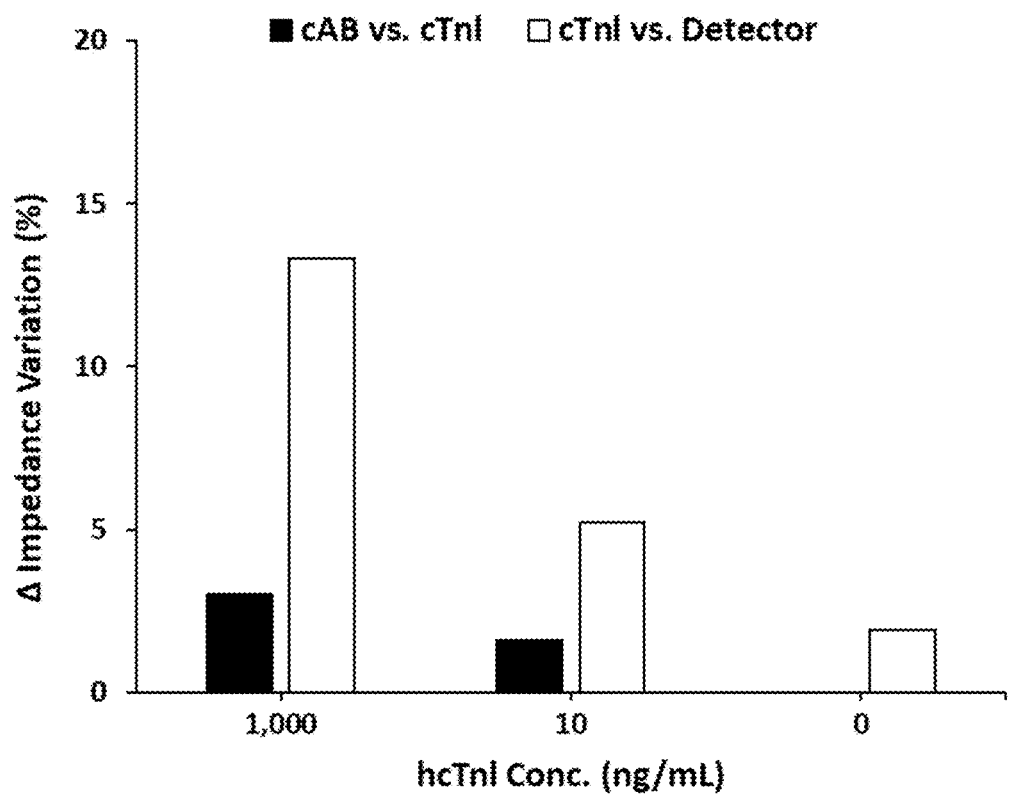

Following this demonstration, a troponin I assay was performed for further demonstration of this integrated IDE platform. FIG. 18A-B show preliminary assay results confirming all fluidic sequence. By testing three different concentrations of troponin I, it was observed that the IDE signals linearly increase with increased concentration of human troponin I. With this assay demonstration, function of the impedance analyzer and the integrated IDE chip was validated, including IDE and the capillary-driven microfluidic chip.

This capillary-driven microfluidic device was designed and tested for autonomous and sequential delivery of reagents necessary to conduct a microparticle-labeled immunoassay. The microfluidic system was designed in two stages for further miniaturization and the addition of sample preparation. For the first time, a vertical CSV was designed and characterized to connect two stages of microfluidics. By characterizing the flow in the channels, the whole assay using this disposable biochip takes about 6 minutes. This chip is designed to be inserted into a handheld compacted case that includes all necessary components for impedance-based biomolecule measurement.

An essential step in conducting a one-step immunoassay using capillary microfluidics is to isolate human serum from a whole blood sample. In microfluidic-based POC applications, this isolation is typically achieved by means of serum separation membranes. The two-layer microfluidic chip described herein allows for the easy implementation of a blood serum separation membrane into the disposable cartridge through a sample inlet.

For a long-term use of this platform, and to maintain surface wetting properties, flow rate in the microfluidic chip can be controlled by means of two main modifications. First, different polymeric materials such as polycarbonate (PC), poly-methyl-meta-acrylate (PMMA), cyclic olefin copolymer (COC), and polyimide can be utilized to overcome the innate drawbacks of PDMS. Secondly, surface modification techniques including layer-by-layer deposition, deposition of polyvinyl alcohol following plasma treatment, or poly(ethylene glycol) coating production can be performed for PDMS surfaces to finely control the hydrophilicity of the PDMS and regulate the overall flow rate of the microfluidic network. Furthermore, by adding one or more absorbent pads in the waste region or in the upper microfluidic stage of the microfluidic network, the flow rate of buffer and sample solutions can be easily regulated, and consequently a wider range of velocity can be obtained.

Example 12

DNA Microarray Applications

The disclosed device and sensor array can also be used for DNA hybridization chips (i.e., DNA microarray) by functionalizing the sensor surface with immobilized "capture" single stranded DNA (ssDNA) molecules, rather than capture antibodies. To implement this concept, the same surface chemistry and functionalization process can be used to immobilize the various ssDNA molecules. Target analyte DNA amplified from polymerase chain reaction (PCR) can then be analyzed on the sensor array. Instead of a microarray reader, which typically utilizes fluorescence signals, differential impedance signals can be measured to determine the concentration level of a large number of genes from DNA or RNA samples without the need for any additional equipment. Thus, the disclosed devices and methods can be used in a broad range of bioassay applications including, for example, immunoassays and DNA microarrays.

What is claimed:

1. A microfluidic device for detection and quantitation of biomolecules, the device comprising:
    (a) a microfluidic chip comprising:
        a multi-layer microfluidic network comprising a microfluidic channel, a buffer inlet, a sample inlet, and a waste outlet, wherein the buffer inlet, the sample inlet, and the waste outlet are in fluid communication with one another via the microfluidic channel, and wherein the microfluidic network is configured to receive a buffer solution and a sample; and
        a substrate layer comprising a surface having a first antibody covalently attached thereto, wherein the first antibody is adapted to specifically bind a target analyte, wherein the first antibody is attached between a first and a second electrode, the first and the second electrodes being part of a plurality of interdigitated electrodes, wherein a distance between each electrode in the plurality of interdigitated electrodes is from about 1 µm to about 10 µm, and wherein the substrate layer is in fluid communication with the microfluidic channel, the first antibody being positioned within the microfluidic channel; and
    (b) a detector for detecting changes in electrical impedance.

2. The device of claim 1, wherein the microfluidic network is comprised of a polymeric material selected from any one of polycarbonate (PC), poly-methyl-meta-acrylate (PMMA), cyclic olefin copolymer (COC), polyimide, polydimethylsiloxane (PDMS), or combinations thereof.

3. The device of claim 2, wherein the microfluidic network is comprised of PDMS.

4. The device of claim 1, wherein the microfluidic network is geometrically dimensioned for autonomous capillary action flow of the buffer solution and the sample.

5. The device of claim 4, wherein the microfluidic network comprises a chamber layer positioned above the microfluidic channel, a capillary valve, and a bridging hole, wherein the chamber layer and the microfluidic channel are in fluid communication with one another via the capillary valve and the bridging hole, and wherein the sample inlet is positioned within the chamber layer.

6. The device of claim 5, wherein the chamber layer comprises a second antibody, wherein the second antibody is adapted to specifically bind the target analyte, and wherein the second antibody is conjugated to a microparticle.

7. The device of claim 6, wherein the second antibody comprises a biotin moiety, the microparticle comprises a streptavidin coating, and the second antibody is conjugated to the microparticle through binding of the biotin moiety to the streptavidin coating.

8. The device of claim 6, wherein the chamber layer further comprises a porous polycarbonate (PC) membrane attached to the sample inlet, and wherein the microparticle conjugated to the second antibody is immobilized on the porous PC membrane.

9. The device of claim 6, wherein the microparticle comprises a magnetic bead, a polystyrene bead, a silica bead, or a combination thereof.

10. The device of claim 9, wherein the microparticle has a size ranging from about 1 µm to about 5 µm in diameter.

11. The device of claim 10, wherein the microparticle comprises a magnetic bead having a size of about 2.8 µm in diameter.

12. The device of claim 5, wherein the capillary valve comprises an orifice having a size ranging from about 100 µm to about 300 µm in diameter.

13. The device of claim 12, wherein the capillary valve comprises an orifice having a size of about 250 µm in diameter.

14. The device of claim 5, wherein the bridging hole comprises an orifice having a size ranging from about 0.5 mm to about 2.5 mm in diameter.

15. The device of claim 14, wherein the bridging hole comprises an orifice having a size of about 1 mm in diameter.

16. The device of claim 1, wherein the buffer solution comprises phosphate buffered saline (PBS) at a concentration ranging from about 0.001 mM to about 1 mM.

17. The device of claim 16, wherein the buffer solution comprises PBS at a concentration of about 0.01 mM.

18. The device of claim 16, wherein the buffer solution further comprises bovine serum albumin (BSA) at about 1 wt %.

19. The device of claim 1, wherein the microfluidic network further comprises one or more absorbent pads.

20. The device of claim 1, wherein the sample inlet further comprises a serum separation membrane.

21. The device of claim 1, wherein the substrate layer comprises a glass substrate or a plastic substrate.

22. The device of claim 1, wherein the first and the second electrode are coated with an electroconductive metal.

23. The device of claim 22, wherein the electroconductive metal is selected from gold (Au), titanium (Ti), or a combination thereof.

24. The device of claim 1, wherein the distance between each electrode in the Plurality of interdigitated electrodes is about 10 μm.

25. The device of claim 1, wherein the first and the second electrode operate at a frequency ranging from about 1 kHz to about 100 kHz.

26. The device of claim 25, wherein the first and the second electrode operate at a frequency of about 10 kHz.

27. A method for detecting and measuring the presence of a target analyte in a sample using the device of claim 1, the method comprising:
 (a) loading a buffer solution into the buffer inlet;
 (b) flowing the buffer solution over the substrate layer;
 (c) loading a sample into the sample inlet;
 (d) mixing the buffer solution with the sample;
 (e) sequentially flowing the mixture of buffer solution and sample over the substrate layer, wherein the target analyte binds to the first antibody;
 (f) continuously flowing the buffer solution over the substrate layer to remove any unbound target analyte; and
 (g) detecting a change in electrical impedance to quantify the concentration of target analyte in the sample.

28. The method of claim 27, wherein flowing is autonomous through capillary action.

29. The method of claim 27, wherein the sample is incubated with a microparticle conjugated to a second antibody before mixing with the buffer solution, wherein the target analyte binds to the microparticle-conjugated second antibody.

30. The method of claim 29, wherein the microparticle conjugated to the second antibody is immobilized on a porous PC membrane, wherein after loading the sample into the sample inlet, the sample drops the porous PC membrane, the microparticle is released from the membrane, and the sample is incubated with the released microparticle conjugated to the second antibody.

31. The method of claim 27, wherein the sample is loaded into the sample inlet after the buffer solution reaches a capillary valve.

32. The method of claim 31, wherein the capillary valve is opened when the sample contacts the buffer solution.

33. The method of claim 27, wherein the sample comprises a blood sample or other biological fluid sample from a subject.

34. The method of claim 27, wherein the method comprises a total assay time ranging from about 5 minutes to about 10 minutes.

* * * * *